(12) United States Patent
Yadagiri et al.

(10) Patent No.: US 11,200,592 B2
(45) Date of Patent: *Dec. 14, 2021

(54) SIMULATION-BASED EVALUATION OF A MARKETING CHANNEL ATTRIBUTION MODEL

(71) Applicant: Adobe Inc., San Jose, CA (US)

(72) Inventors: Meghanath Macha Yadagiri, Bellandur Amanikere (IN); Ritwik Sinha, Bellandur Amanikere (IN); Shiv Kumar Saini, Bellandur Amanikere (IN)

(73) Assignee: ADOBE INC., San Jose, CA (US)

(*) Notice: Subject to any disclaimer, the term of this patent is extended or adjusted under 35 U.S.C. 154(b) by 127 days.

This patent is subject to a terminal disclaimer.

(21) Appl. No.: 16/514,576

(22) Filed: Jul. 17, 2019

(65) Prior Publication Data

US 2019/0340641 A1 Nov. 7, 2019

Related U.S. Application Data

(63) Continuation of application No. 15/005,205, filed on Jan. 25, 2016, now Pat. No. 10,387,909.

(51) Int. Cl.
*G06Q 30/00* (2012.01)
*G06Q 30/02* (2012.01)
*G06Q 10/06* (2012.01)

(52) U.S. Cl.
CPC ....... *G06Q 30/0244* (2013.01); *G06Q 10/067* (2013.01)

(58) Field of Classification Search
None
See application file for complete search history.

(56) References Cited

U.S. PATENT DOCUMENTS 8,656,046 B2 * 2/2014 Barger ................... G06F 16/40
709/236
8,788,339 B2 * 7/2014 Hughes .............. G06Q 30/0255
705/14.46

(Continued)

FOREIGN PATENT DOCUMENTS

CN 105323601 A * 2/2016 ........... H04N 21/258
JP 2005011307 A * 1/2005 ............. G06F 17/30

OTHER PUBLICATIONS

Maiste, Paul. Probability and Statistics for Bioinformatics and Genetics Course Notes. (May 2, 2006). Retrieved online Mar. 23, 2019. http://www.ams.jhu.edu/~dan/550.435/notes/COURSENOTES435.pdf (Year: 2006).*

(Continued)

*Primary Examiner* — James A Reagan
(74) *Attorney, Agent, or Firm* — Kilpatrick Townsend & Stockton LLP

(57) ABSTRACT

This disclosure involves allocating content-delivery resources to electronic content-delivery channels based on attribution models accuracy. For instance, a simulation is executed that involves simulating user exposures, times between user exposures, and user responses. The simulation is performed based on parameters associated with simulating user exposures to electronic content-delivery channels and user responses to the user exposures. An accuracy of a channel attribution model when estimating an attribution of an electronic content-delivery channel to a user response is evaluated based on the simulation. A channel attribution model is selected based on the evaluation. An attribution of the electronic content-delivery channel is determined by applying the selected channel attribution model to actual user exposures and actual user responses. This attribution can be used to allocate content-delivery resources to the electronic content-delivery channel in accordance with the (Continued)

selected channel attribution model, and thereby provide interactive content via the electronic content-delivery channel.

20 Claims, 10 Drawing Sheets

(56) References Cited

U.S. PATENT DOCUMENTS

| | | | | |
|---|---|---|---|---|
| 9,158,745 | B2* | 10/2015 | Barger | G06F 40/103 |
| 9,489,630 | B2* | 11/2016 | Achin | G06N 5/02 |
| 9,697,534 | B2* | 7/2017 | Schnabl | G06Q 30/0244 |
| 9,875,484 | B1* | 1/2018 | Schnabl | G06Q 30/0242 |
| 10,387,909 | B2* | 8/2019 | Yadagiri | G06Q 10/067 |
| 2011/0014972 | A1* | 1/2011 | Herrmann | G06Q 30/0224 |
| | | | | 463/25 |
| 2011/0040613 | A1* | 2/2011 | Simmons | G06Q 30/0249 |
| | | | | 705/14.42 |
| 2013/0035975 | A1* | 2/2013 | Cavander | G06Q 30/02 |
| | | | | 705/7.22 |
| 2014/0379490 | A1* | 12/2014 | Schnabl | G06Q 30/0256 |
| | | | | 705/14.71 |
| 2016/0042197 | A1* | 2/2016 | Gkoulalas-Divanis | |
| | | | | G06F 16/176 |
| | | | | 707/781 |
| 2016/0098735 | A1* | 4/2016 | Sinha | G06Q 30/0202 |
| | | | | 705/7.31 |
| 2016/0170996 | A1* | 6/2016 | Frank | G06F 16/24578 |
| | | | | 707/748 |
| 2017/0213237 | A1* | 7/2017 | Yadagiri | G06Q 10/067 |

OTHER PUBLICATIONS

Diakonikolas et al. The Fourier Transform of Poisson Multinomial Distributions and its Algorithmic Applications. (Nov. 13, 2015). Retrieved online Mar. 23, 2019. http://www.iliasdiakonikolas.org/papers/fourier-pmd.pdf (Year: 2015).*
John Winston Chandler-Pepelnjak. Modeling Conversions in Online Advertising. (2010). Retrieved online Aug. 22, 2021. https://scholarworks.umt.edu/cgi/viewcontent.cgi?article=1689&context=etd (Year: 2010).*
Abhishek et al., "Media Exposure through the Funnel: A Model of Multi-Stage Attribution", SSRN, available online at http://ssrn.com/abstract2158421 or http://dx.doi.org/10.2139/ssm.2158421, Aug. 17, 2012, 45 pages.
Armstrong et al., "Error measures for generalizing about forecasting methods: Empirical comparisons", International Journal of Forecasting, vol. 8, No. 1, Jun. 1992, pp. 69-80.
Dalessandro et al., "Causally motivated attribution for online advertising", ADDKDD'12 In Proceedings of the Sixth International Workshop on Data Mining for Online Advertising and Internet Economy, Aug. 12, 2012, 9 pages.
Davis , "What is Google Attribution Modeling Do you need it", Blast Analytics & Marketing Consulting Company, available online at http://www.blastam.com/blog/index.php/2013/01/what-is-google-attribution-modeling-do-you-need-it, Jan. 26, 2013, 12 pages.
Gupta et al., "Factoring Past Exposure in Display Advertising Targeting", Proceedings of the 18th ACM SIGKDD international conference on Knowledge discovery and data mining, Aug. 12-16, 2012, 9 pages.
Shao et al., "Data-driven Multi-touch Attribution Models", In Proceedings of the 17th ACM SIGKDD International conference on Knowledge discovery and data mining, Aug. 21-24, 2011, pp. 258-264.
Sinha et al., "Estimating the incremental effects of interactions for marketing attribution", International Conference on Behavioral, Economic, Socio-Cultural Computing, 2014, 6 pages.
Skidmore , "A comparison of techniques for calculating gradient and aspect from a gridded digital elevation model", International Journal of Geographical Information Systems, vol. 3, No. 4, 1989, pp. 323-334.
Yadagiri et al., "A Non-parametric approach to Multi-channel attribution using Shapely Value", Web Information Systems Engineering vol. 9418 of the series Lecture Notes in Computer Science, Dec. 25, 2015, pp. 338-352.
Maiste, Paul, "Probability and Statistics for Bioinformatics and Genetics Course Notes", May 2, 2006, retrieved online Mar. 23, 2019, http://www.ams.jhu.edu/-dan/55Q.435/notes/COURSeNOE435.pdf, 2006.
Diakonikolas, et al., "The Fourier Transform of Poisson Multinomial Distributions and ITS Algorithmic Applications", Nov. 13, 2015, retrieved online http://www.illiasdiakonikolas.org/papers/fourier-ond,odf, 2015.
Li, Hongshuang (Alice) and P.K. Kannan (2014), "Attributing Conversions in a Multichannel Online Marketing Environment: an Empirical Model and a Field Experiment", Journal of Marketing Research, 51 (February), 40-56, 2014.
Notice of Allowance from related U.S. Appl. No. 15/005,205, dated Jul. 3, 2019, 25 pages.

* cited by examiner

SIMULATION-BASED EVALUATION OF A MARKETING CHANNEL ATTRIBUTION MODEL

CROSS-REFERENCE TO RELATED APPLICATIONS

This application is a continuation application of application Ser. No. 15/005,205, filed Jan. 25, 2016, now allowed, which is incorporated herein by reference in its entirety.

TECHNICAL FIELD

This disclosure relates generally to techniques for data mining of user interactions with marketing channels.

BACKGROUND

Network-based communications provide extensive functionalities to users. For example, the Internet allows any user to operate a device and access content or communicate with other devices. The functionalities have spurred the development of many industries, among which is the online marketing industry. In particular, the online marketing industry relies greatly on network-based communications to distribute marketing materials to users.

Generally, the distribution of marketing materials, such as advertisements, occurs over a number of marketing channels. Each marketing channel represents a channel for reaching users via a particular type of communication network. For example, a web channel enables the distribution of online advertisements in web pages over the Internet. Similarly, a social media channel enables the distribution of online advertisements as posts on social media platforms over the Internet. On the other hand, a mobile channel enables the distribution of mobile advertisements to mobile and smart phones over wireless networks.

A marketer manages usage of the marketing channels through a marketing platform to maximize a desired user response. For example, the marketer selects certain marketing channels that would result in the highest possible user conversion. A user conversion occurs when a user purchases, orders, or obtains a product advertised through one or more of the marketing channels.

Hence, a user operating a computing device connected to a communication network is commonly exposed to multiple marketing channels. For example, the user receives marketing material via e-mail, mobile message, display advertising, social media and so on. All these impressions influence the decision of the user to convert or not. To maximize conversions, the marketer needs to understand how each of these marketing efforts affects the user's decision and, accordingly, optimize usage of the marketing channels. Interpreting the influence of various marketing channels to the user's decision process is called marketing attribution.

Optimizing usage of marketing channels results in many technical advantages to the marketer. In particular, usage of a marketing channel is network-centric and necessitates an allocation of network resources to the marketing channel. For example, sending a web advertisement from a head end server to a user device consumes network bandwidth along with memory and processing power of the head end server. Hence, the more optimal the marketing channel usage is, the more efficient the usage of the underlying network resources becomes.

The online marketing industry has tackled the usage optimization by implementing models for estimating the marketing attribution. A marketing channel attribution model attributes credit to a marketing channel for resulting in the desired user response. The usage of the marketing channel is managed by the marketer based on the attributed credit.

Various marketing channel attribution models are available to the marketer and are implemented within marketing platforms. The accuracy of estimating an attribution of a marketing channel varies with the applied marketing channel attribution model. For example, one model estimates the attribution more accurately than another model given a set of parameters that relate to the user exposures and user responses.

However, existing marketing plaforms fail to compare the accuracies of marketing channel attribution models. The existing marketing platforms also fail to measure how accurate each model is given a relevant set of parameters. Without an evaluation of the respective accuracies, the marketer is unable to select and apply the most appropriate marketing channel attribution model. Hence, in certain situations, the attributions that the marketer uses to manage the marketing channels via an existing marketing platform are not the most accurate. This ultimately leads to a sub-optimal use of the underlying network resources.

SUMMARY

This disclosure involves allocating content-delivery resources to electronic content-delivery channels based on attribution models accuracy. For instance, a simulation is executed that involves simulating user exposures, times between user exposures, and user responses. The simulation is performed based on parameters associated with simulating user exposures to electronic content-delivery channels and user responses to the user exposures. An accuracy of a channel attribution model when estimating an attribution of an electronic content-delivery channel to a user response is evaluated based on the simulation. A channel attribution model is selected based on the evaluation. An attribution of the electronic content-delivery channel is determined by applying the selected channel attribution model to actual user exposures and actual user responses. This attribution can be used to allocate content-delivery resources to the electronic content-delivery channel in accordance with the selected channel attribution model, and thereby provide interactive content via the electronic content-delivery channel.

These illustrative features are mentioned not to limit or define the disclosure, but to provide examples to aid understanding thereof. These and additional features may be implemented independently in various embodiments or may be combined in yet other embodiments, further details of which can be seen with reference to the following description and illustrations. Advantages offered by one or more of the various embodiments may be further understood by examining the specification or by practicing one or more of the various embodiments.

BRIEF DESCRIPTION OF THE FIGURES

These and other features, embodiments, and advantages of the present disclosure are better understood when the following Detailed Description is read with reference to the accompanying drawings.

DETAILED DESCRIPTION

Figure 1:
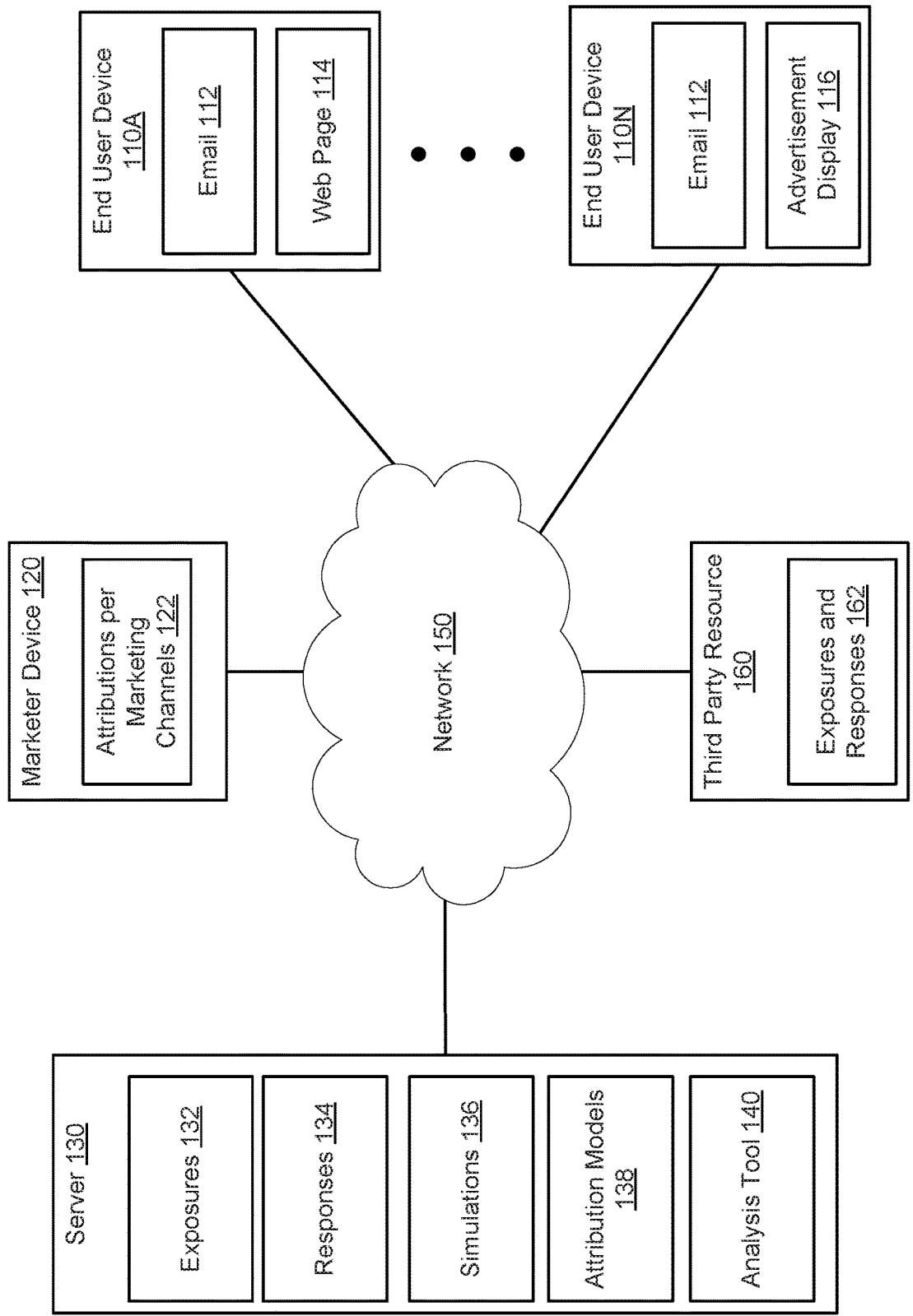
FIG. 1 illustrates an example of a computing environment that includes a plurality of marketing channels, according to certain embodiments of the present disclosure.

Specific details of various exemplary embodiments of the present invention are set forth in the following description and are illustrated in FIGS. 1-10. The various embodiments described herein can be implemented in hardware, software, or a combination thereof. In the figures, similar symbols may identify similar components, unless context dictates otherwise. Certain well-known technology details, such as methods, apparatus, or systems that would be known by one of ordinary skill, are not set forth in the following description or in the figures to avoid unnecessarily obscuring the various examples. Those of ordinary skill in the relevant art will understand that they can practice other examples of the disclosed subject matter without departing from the scope and spirit of the present invention.

Generally, the embodiments described herein are directed to, among other things, evaluating marketing channel attribution models. As used herein, a "marketing channel" represents a computing service, medium, or channel for providing a marketing service over a communication network. Sending an advertisement for a product is an example of a marketing service. An email, a banner space of a web page a text message of a mobile device, and a post on a social media page used for the advertisement are examples of the marketing service. A "marketing channel attribution model" represents a model configured to generate an attribution of a marketing channel to a user response. The attribution represents a credit allocated to the marketing channel when the user response is exhibited based on a user exposure to the marketing channel.

Specifically, disclosed are methods, systems, and computer readable media that embody techniques for determining how accurately a marketing channel attribution model estimates attributions of marketing channels given a set of parameters. In an example, the techniques involve simulating user journeys given the set of parameters. The user journeys include user exposures to marketing channels and user responses to the user exposures. A "user exposure" represents an exposure of a user to a marketing channel via a medium, such as opening an email marketing a product or accessing a web page with a banner space. A "user response" represents a response of the user to the user exposure. For example, the user response includes a conversion (e.g., purchase, click through, view of a page, etc.) or a no conversion. The set of parameters relate to the user journeys and include, for example, the number of users, the number of marketing channels, an average number of marketing channels that a user is exposed to, an average time between exposures of marketing channels, and usage frequencies of the marketing channels. Thus, simulating the user journeys includes simulating user exposures and the user responses according to different parameters that are specific to the users and the marketing channels. Once simulated, the true attribution of each marketing channel is computed. For example, a particular marketing channel is removed from the simulation. The resulting user responses are compared to the original user conversions. The difference corresponds to the true attribution of the marketing channel. Determining what exposures to the marketing channel resulted in actual user conversions is possible because the simulation uses known parameters.

To determine how accurate the marketing channel attribution model is, the simulated user journeys are input to the model. The resulting output includes estimated attributions of the marketing channels. The estimated attributions are compared to the true attributions to determine the accuracy of the marketing channel attribution model. Similar evaluations are performed for other marketing channel attribution models. The marketing channel attribution models are ranked according to the respective accuracies. Accordingly, a recommendation is made to use a particular marketing channel attribution model (e.g., the one with the highest accuracy) given the set of parameters.

To illustrate, consider an example of a marketing platform of a service provider. The marketing platform identifies different marketing channels to a marketer. The marketer selects some or all of the marketing channels for a marketing campaign and allocates resources to the selected marketing channels. While the users are exposed to the marketing channels, the service provider tracks the exposure of each user and the resulting response via the marketing platform. As such, a large amount of data for millions of users is collected on a periodic basis (e.g., daily). Upon a request of the marketer, the marketing platform applies a marketing channel attribution model to estimate the attribution of each marketing channel for a particular user response (e.g., a conversion). The analysis is performed in real-time on the most up-to-date user data (e.g., data corresponding to the current week of the marketing campaign). Thus, the marketing attributions are provided in real-time to the marketer and enable the marketer to properly manage the marketing campaign in real-time.

Several marketing channel attribution models are available to the marketer. Applying the most accurate model enables the marketer to use the best attribution estimates. Given that the accuracy varies with parameters specific to the users, the marketing campaign, and the marketer, the electronic platform simulates the user journeys based on these parameters. The accuracies of the marketing attribution channels are derived from the simulation. The most accurate marketing attribution channel model is selected. For example, the marketing platform automatically selects the most accurate marketing attribution channel model. In another example, a ranking of the marketing attribution channel models is presented to the marketer based on the respective accuracies. In response, a selection of one of the models is received.

The marketing platform applies the selected marketing channel attribution model to estimate the attributions. For example, the tracked user data are input to the selected marketing channel attribution model. The resulting output represents the attributions. In addition, the marketing platform compares the attributions. Recommendations to improve the marketing campaign are derived from the comparison. For example, if a marketing channel has a low attribution, a recommendation identifies this marketing channel as a candidate for removal and proposes reallocation of the respective resources to another marketing channel. In another example, a recommendation presents reasons why resources of a particular marketing channel resulted in a high marketing attribution and proposes using similar resources for a lower performing marketing channel. The recommendations are presented to the marketer as part of managing the marketing campaign. In response, an adjustment to usage of a particular marketing channel is made (e.g., resources are reallocated from or to the marketing channel).

Hence, many advantages are provided over existing techniques for estimating attributions of marketing channels and managing marketing campaigns. These existing techniques do not provide a way to estimate or compare the accuracies of marketing channel attribution models. In comparison, the embodied techniques of the present disclosure not only compare such accuracies, but also evaluate how accurate each model is given a set of parameters. As such, the embodied techniques enable a marketer to receive better attribution estimates, thereby improving the management of the marketer's marketing campaign. In an example, the improvement involves reallocating resource to the marketing channels of the marketing campaign. Some of these resources are network resources. By using the most accurate attributions, usage of the network resources is optimized as much as possible.

Turning to FIG. 1, the figure illustrates an example of a computing environment where a large number of users are exposed to a plurality of marketing channels on a periodic basis. The computing environment represent a network-centric environment where a large amount of user data (e.g., for millions of users) is tracked and analyzed to controllably balance usage of network resources. In an example, what marketing channels to use depends on an accurate estimation of marketing attributions based on the data. Absent the embodied techniques of the present disclosure, analyzing such large amount of data to accurately estimate marketing attributions is not feasible. Further, because network resources are allocated to marketing channels, optimizing usage of the marketing channels based on the data analysis also optimizes the network resource allocations. The embodied techniques controllably balance usage of the marketing channels and, thus, enable the optimization of the network resource allocations.

One exemplary embodiment involves a marketing platform that supports a large number of marketing channels usable to reach millions of users on a daily basis over a wide range of network communications. The marketing platform is configured to evaluate marketing channel attribution models. The marketing platform is also configured to provide an interface to a marketer for managing usage of the marketing channels, thereby affecting the allocation of network resources to the marketing channels.

In an example, the marketing platform is accessible to the marketer via a computing device. The marketer interfaces with the marketing platform to identify certain parameters related to user exposures to the marketing channels and user responses to the user exposures. For instance, the parameters include the number of users to be targeted, average number of marketing channels that each user is exposed to, average time between exposures, usage frequencies of marketing channels, and other marketing campaign-related parameters.

In turn, the marketing platform simulates the user exposures and the user responses under known and controllable parameters. The simulation mimics user exposures and user responses expected in the real network environment. Because there is a large number of parameters and marketing channels and because there is even a much larger number of users, the simulation results in a large amount of simulated data points (e.g., millions of simulated user exposures and user responses).

The marketing platform determines the true attribution of each marketing channel to a desired user response (e.g., a user conversion) from the simulation. The true attribution of a marketing channel represents the actual credit that the marketing channel should get from a user exposure to the marketing channel that results in the desired user response. Because the simulation uses the parameters and because the parameters are known and controllable, it is possible to determine, for instance, the increase in propensity of a user to exhibit the desired user response when exposed to a certain marketing channel. As such, the computation of the true attribution of that marketing channel is possible from the simulation.

In addition, the marketing platform inputs the simulation to a marketing channel attribution model. The output represents attributions that are estimated by the marketing channel attribution model for the attribution channels. For each marketing channel, the marketing platform compares the true attribution to the respective estimated attribution. The comparison enables the marketing platform to evaluate the accuracy of the marketing channel attribution model associated with estimating the attributions. For example, the greater the difference between the true and estimated attributions are, the less accurate the marketing channel attribution model is.

The marketer interfaces with the marketing platform to receive information about the accuracies of the marketing channel attribution models. Based on the information, the marketer selects one of the models. Alternatively, the marketer sets up rules for a dynamic selection by the marketing platform based on the accuracies.

In turn, the marketing platform uses the selected marketing channel attribution model to estimate the actual attributions of the marketing channels in the real network environment. For example, the marketing platform tracks data related to actual user exposures and actual user responses in the real network environment. The amount of data is very large and relates to millions of users. The data is input to the selected marketing channel attribution model to estimate the actual attributions.

The marketer also interfaces with the marketing platform to receive information about the actual attributions. Based on the information, the marketer modifies usage of the marketing channels. Alternatively, the marketer sets up rules for a dynamic modification by the marketing platform based on the actual attributions. For example, the lower the actual attribution of a marketing channel is, the less frequently that marketing channel is used.

In an example, the most accurate marketing channel attribution model is selected. As such, the actual attributions are the most accurate attributions that could be estimated. By relying on the most accurate attributions, management of the marketing channels is improved. In particular, usage of the marketing channels is optimized as much as possible. This optimization translates into improvements to how the underlying network resources are used. For example, if sending a web advertisement from a head end server to a user device does not lead to a desired user response (e.g., to a user conversion at a desired frequency), usage of that marketing channel is reduced. This reduction saves consumption of network bandwidth and memory and processing power of the head end server that would otherwise be inefficiently used.

Hence, the embodiments of the present disclosure can provide a marketing platform for managing marketing channels in a network environment that exposes a large number of marketing channels to a great number of users under different parameters. Unlike existing marketing platforms, the marketing platform of the present disclosure informs the marketer about available marketing channel attribution models and accuracies of such models. In addition, the marketing platform enables a selection of the most accurate marketing channel attribution model. As such, the estimated attributions of the marketing channels are the most accurate estimations. This improved accuracy results in improved usage of the underlying network resources.

As illustrated in FIG. 1, multiple users operate multiple computing devices shown as end user devices 110A-N. At each user device, a corresponding user is exposed to marketing information. The marketing information is provided to the end user device through a combination of marketing channels. For example, an email 112 and a web page 114 are presented at the end user device 110A, where each can contain the same or different marketing information. In comparison, a same or different email 112 and an advertisement display 116 are presented at the end user device 110N. Other combinations and a larger or lower number of marketing channels are available and used across the different end user devices 110A-N.

A marketer operates a computing device, shown as a marketer device 120, to manage a marketing campaign. This management includes, for example, generating the marketing information and deciding what marketing channels to use to distribute the marketing information to the end user devices 110A-N.

A service provider operates a computing system, shown as a server 130, to provide the marketing channels. The computing system, including the server 130, implements some or all of the functionalities of a marketing platform. The marketing platform is remotely accessible to the marketer device 120. Based on the marketing platform, the service provider enables the marketer to send emails, bid on advertisement space within web pages, generate an advertisement web page, bid on keyword searches for presenting advertisement, post advertisement or news on a social media web site, etc.

As such, the marketer operates the marketer device 120 to communicate with the server 130 of the service provider over a network 150, provide the marketing information and/or select the marketing channels. In turn, the marketing information is provided from the server 130 and/or the marketer device 120 to the end user devices 110A-N over the network 150. The marketing information is delivered according to the marketing channels, such as via the email 112, the web page 114, and the advertisement display 116, and other marketing channels. The network 150 includes a data communication network that can be in part or in full a public network, such as the Internet, or a private network, such as an Intranet.

The server 130, or more generally the computing system of the service provider, is configured to track the exposures 132 and responses 134 of the users to the marketing channels. For example, the exposures 132 and the responses 134 are stored in local storage of the server 130 or at a storage remotely accessible to the server 130. The exposures 132 include data identifying what marketing channel(s) (e.g., individual and combination of marketing channels) each user has been exposed to, such as the marketing channel(s) used for providing marketing information to the corresponding end user device. The responses 134 include data identifying the response that each user exhibited as a result of being exposed to a marketing channel(s) (e.g., individual and combination of marketing channels). For example, the responses 134 identify if a user conversion (e.g., a purchase, click through, page view) occurred or not as a result of an exposure. Although FIG. 1 illustrates the exposure 132 and the responses 134 as being tracked in two different data sets, a single data set can nonetheless be used for tracking them together. Further, some or all of the exposures 132 and/or responses 134 can be available from a third party. As illustrated in FIG. 1, a third party operates a third party resource 160 to track and store exposures and responses 162. The third party can provide the service provider the exposures and responses 162 for analysis in lieu of, or in addition to, the exposures 132 and the responses 134.

In addition, the server 130, or more generally the computing system of the service provider, is configured to generate simulations 136 of user journeys. A user journey includes user exposures to different marketing channels (e.g., from the marketing campaign) and the user responses to the user exposures (e.g., no conversion after an exposure to an email but conversion after an advertisement display). The server 130 implements a simulation engine to generate the simulations 136. The simulations 136 include a simulation associated with the marketing campaign of the marketer. For example, a user interface is provided to the marketer to set parameters of the simulation. In response, the simulation engine generates the simulation. In another example, the marketer's input is not needed or is supplemented. The simulation engine derives the set of parameters from the settings of the marketing campaign and/or from the collected exposures 132 and responses 134. For instance, the simulation engine derives the number of users, the average number of user exposures per user, timing between the user exposures, and other relevant parameters and uses the derived parameter for the simulation.

Different marketing channel attribution models 138 are stored at the server 130 or, more generally, at a data store accessible to the computing system of the service provider. Some of these models 138 are uploaded to the server 130 from the marketer device 120. Remaining ones are locally generated or uploaded from a resource of the service provider or of a third party. Generally, each of the marketing channel attribution models 138 implements a technique to evaluate attributions of marketing channels. An example includes a rule-based model. In this model, a rule allocates the highest attribution to the last marketing channel that the user is exposed to before a conversion. Another example includes an algorithm-based model. In an illustration, the algorithm-based model assumes relationships between exposures to marketing channels and user conversion. A logistic regression function is applied to estimate the attribution of each marketing channel. In another illustration, no assumptions are made. Instead, the algorithm-based model analyzes all combinations of marketing channels and the resulting user conversion to estimate the respective attributions.

To evaluate the accuracies of the marketing channel attribution models 138 and analyze exposures and responses, the service provider implements an analysis tool 140. As illustrated in FIG. 1, the analysis tool 140 is hosted at the server 130. However, the analysis tool 140 can be hosted on another computing resource accessible to the service provider and in communication with the server 130. The analysis tool 140 provides different functions.

One function includes evaluating the accuracies of the marketing channel attribution models 138 given different parameters. The evaluation includes ranking the marketing channel attribution models 138. The evaluation also includes, optionally, providing a recommendation to use one of the marketing channel attribution models 138 given a set of parameters. In particular, the analysis tool 140 accesses a simulation from the simulation 138 that is relevant for a set of parameters, including, for example, the number of users, the average number of marketing channels, the set of marketing channels, the average number of exposures to marketing channels per user, average time between the exposures, and usage frequencies of the marketing channels. The true attribution of each marketing channel is determined from the simulation. The analysis tool 140 also inputs the simulation to a marketing channel attribution model and, accordingly, estimates the attributions of the marketing channels. The true and estimates attributions are compared. The comparison indicates how accurate the marketing channel attribution model is with respect to estimating the attributions given the set of parameters. For example, the larger the deviation between the true and estimates attributions, the less accurate the marketing channel attribution model is. The analysis tool 140 compares the accuracies of the different marketing channel attribution models 138 to create a ranking. A recommendation to apply one of the marketing channel attribution models 138 (e.g., the best ranked or, equivalently, the most accurate) is provided to the marketer device 120.

Another function of the analysis tool 140 analyzes the exposures 132, responses 134, and, as applicable, the exposures and responses 162 and estimates the attribution of each marketing channel. The analysis includes applying a particular model from the marketing channel attribution models 138 to the exposures 132, responses 134, and exposures and responses 162. In an example, the particular model is automatically selected by the analysis tool 140 based on a selection rule. The selection rule specifies that the best ranked marketing channel attribution model should be used. Such a rule allows a dynamic and automatic control over what model to use. In another example, a selection of the marketing channel attribution model is received from the marketer device 120. Once selected, the marketing channel attribution model is applied to estimate the attributions. The attributions can be estimated for a particular user response. For example, an attribution of a marketing channel is estimated for a user conversion (e.g., a purchase) resulting from exposures to the marketing channel individually and in combination with other marketing channels.

The evaluation of and, optionally, recommendation associated with the marketing channel attribution models 138 and attributions are provided to the marketer device 120 over the network 150. For example, this information is sent to the marketer device 120 upon demand or as a push. The marketer device 120 stores the attributions, shown in FIG. 1 as attributions per marketing channels 122. Various usages of the attributions are available to the marketer. In one example usage, the marketer assesses the attributions of each marketing channel with respect to a particular user response and compares the attributions of the different marketing channels to understand which marketing channels have a higher return. For example, if a first marketing channel has a higher attribution than a second marketing channel with respect to user purchases, the marketer can determine that the first marketing channel is more efficient.

In another example usage, the attributions are further analyzed and actions are recommended and/or automatically implemented based on the analysis. Such analysis enables a dynamic and automatic control that balances usage of the marketing channels. For instance, the analysis tool 140 (or an analysis tool at the marketer device 120) analyzes the attributions to rank the marketing channels in terms of efficiencies (e.g., the higher the attribution, the more efficient the marketing channel may be). A recommendation not to use marketing channels falling below a certain rank (e.g., the two lowest marketing channels) can be made. If the recommendation is implemented (automatically or upon an authorization of the marketer), resources allocated to these marketing channels (e.g., associated budgets from the marketing campaign) can be shifted to the remaining marketing channels. Additionally or alternatively, actions performed in support of using each marketing channel are analyzed. For instance, actions associated with a low ranked marketing channel and a high ranked marketing channel are compared to identify reasons for the success of the latter and, accordingly, improve usage of the former. To illustrate, if the analysis indicates that the marketing information used in the high ranked marketing channel (e.g., the format, content, presentation, etc. of an associated advertisement) is a reason, similar or the same marketing information can be used in the low ranked marketing channel to improve its attribution.

Hence, the service provider is able to offer different services to marketers based on the computing environment of FIG. 1. One service includes managing marketing campaigns. The management is enhanced in different ways. For example, a marketer of a marketing campaign is able to assess the attribution of each marketing channel that belongs to the marketing campaign. The assessment uses the most accurate marketing channel attribution model. Thus, the marketer has access to the best possible attributions and is able to, accordingly, allocate the proper resources to the marketing channels.

Although FIG. 1 illustrates a server-client architecture where the server hosts an analysis tool and the client subscribes to outputs of that tool, the embodiments described herein are not limited as such. Instead, the embodiments similarly apply to a different distributed or non-distributed architecture. For example, a marketer device hosts the analysis tool. In another example, the marketer device hosts one of the functions of the analysis tool (e.g., the simulation of user journeys and/or evaluation of a marketing channel attribution model).

Figure 2:
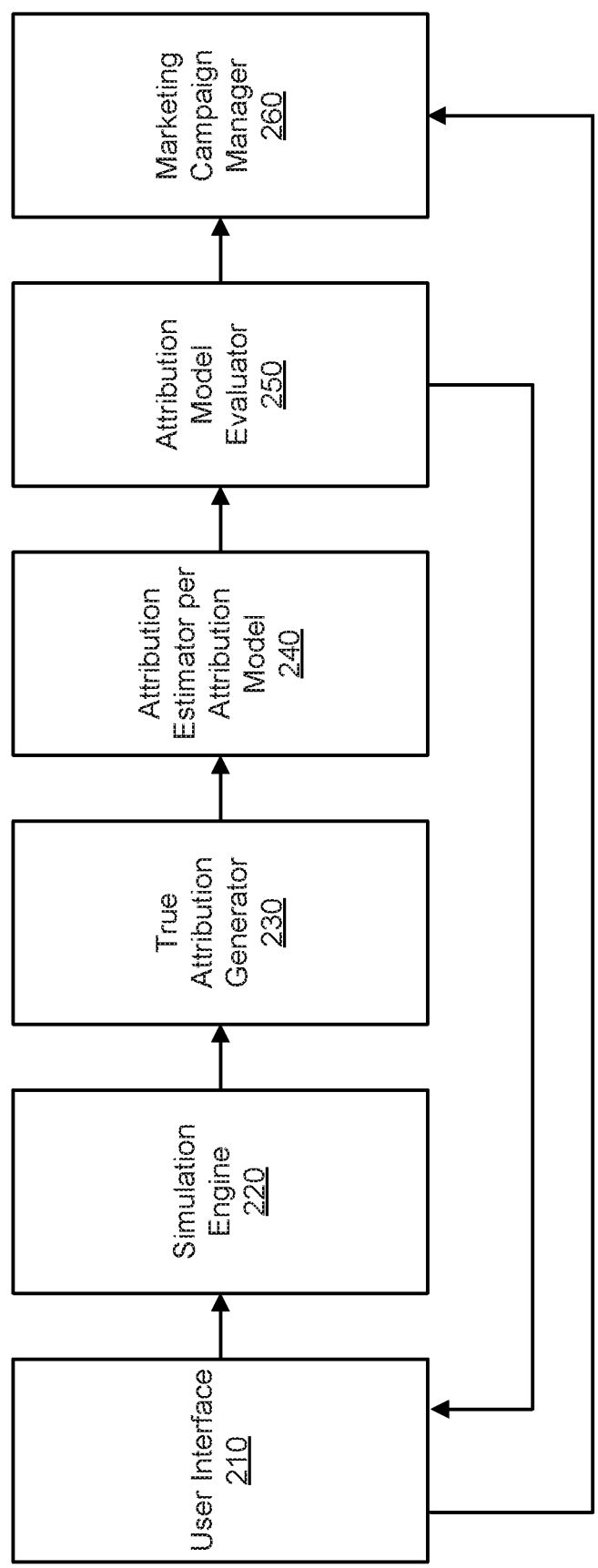
FIG. 2 illustrates an example block diagram for evaluating marketing channel attribution models, according to certain embodiments of the present disclosure.

Turning to FIG. 2, the figure illustrates example modules that an analysis tool (e.g., the analysis tool 140 of FIG. 1) implements to at least simulate user journeys and evaluate marketing channel attribution models. Each of the modules is implemented in hardware and/or software or firmware hosted hardware. As illustrated, the modules include a user interface 210, a simulation engine 220, a true attribution generator 230, an attribution estimator 240, an attribution model evaluator 250, and a marketing campaign manager 260. The modules 210-260 are described herein next.

In an example, the user interface 210 provides an interface to a user, such as a marketer, for providing inputs and receiving outputs in association with a marketing campaign. The user operates a user device, such as a marketer device, to access the user interface 210. The user interface 210 enables various inputs. For instance, the user identifies the marketing campaign, configures settings of the marketing campaign (e.g., selects marketing channels, defines a time period and targeted number of users, allocate resources, etc.), sets up rules for selecting a marketing channel attribution model based on an associated accuracy, sets up rules for adjusting usage of marketing channels based on associated attributions, requests attribution of each marketing channel to a desired user response (e.g., a conversion), request simulations of user journeys, and/or requests evaluation of marketing channel attribution models. The user interface 210 also enables various outputs. For instance, the user interface 210 presents selectable marketing channels and respective settings, attributions of the marketing channels, outputs of the simulations, and evaluations of the marketing channel attribution models. An example of the user interface 210 is further illustrated in FIG. 3.

The simulation engine 220 generates simulations of user journeys. In an example, the user inputs parameters for a simulation at the user interface 210. In turn, the simulation engine 210 accesses the parameters to generate the simulation. The true attribution generator 230 generates a true attribution of a marketing channel based on the simulation. For example, the true attribution generator 230 accesses the simulation of the simulation engine 220 and computes, for each simulated marketing channel, the respective attribution from the simulation.

Similarly, the attribution estimator 240 generates an estimated attribution of the marketing channel based on the simulation. Rather than a true attribution, the estimated attribution is based on one of the marketing channel attribution models. For example, the user selects a marketing channel attribution model at the user interface 210. The attribution estimator 240 applies the selected model to the simulation of the simulation engine 220 to output the estimated attribution of each marketing channel given the selected model.

The attribution model evaluator 250 evaluates marketing channel attribution models. The evaluation includes evaluating an accuracy of a marketing channel attribution model and comparing the accuracy to those of other marketing channel attribution models. For example, the attribution model evaluator 250 compares the true attribution of marketing channels from the true attribution generator 230 to the estimated attribution of the marketing channels for a particular marketing channel attribution model (e.g., the selected model at the user interface 210) as outputted from the attribution estimator 240. The accuracy of the particular marketing channel attribution model is derived from the comparison. The different marketing channel attribution model are also ranked given the respective accuracies.

FIG. 2 illustrates that the evaluation of the attribution model 250 is provided to the user interface 210 for presentation to the user. However, the embodiments described herein are not limited as such. Instead, the embodiments similarly apply. Instead, each of the outputs from the modules 220-250 can also be similarly provided for presentation at the user interface 210.

In addition, the marketing campaign manager 260 enables the user to manage a marketing campaign of the user. This management is, in part, based on the simulations of user journeys and evaluations of marketing channel attribution models. In an example, the marketing campaign manager 260 accesses the user's input at the user interface 210 to manage the marketing campaign. As such, if the user sets a certain setting or allocates a certain resource to a marketing channel, the campaign manager 260 sets usage of the marketing channel accordingly. Some of the management is also automated based on the output of the attribution model evaluator 250 and/or attribution model estimator 240. For instance, if the attribution of a marketing channel is lower than a threshold, the frequency of usage of the marketing channel is automatically reduced and/or resources allocated to that marketing channel are automatically shifted to another marketing channel. The automation follows different rules. Some of the rules (e.g., the threshold, what resources to re-allocate, etc.) are created based on the user's input at the user interface 210.

Figure 3:
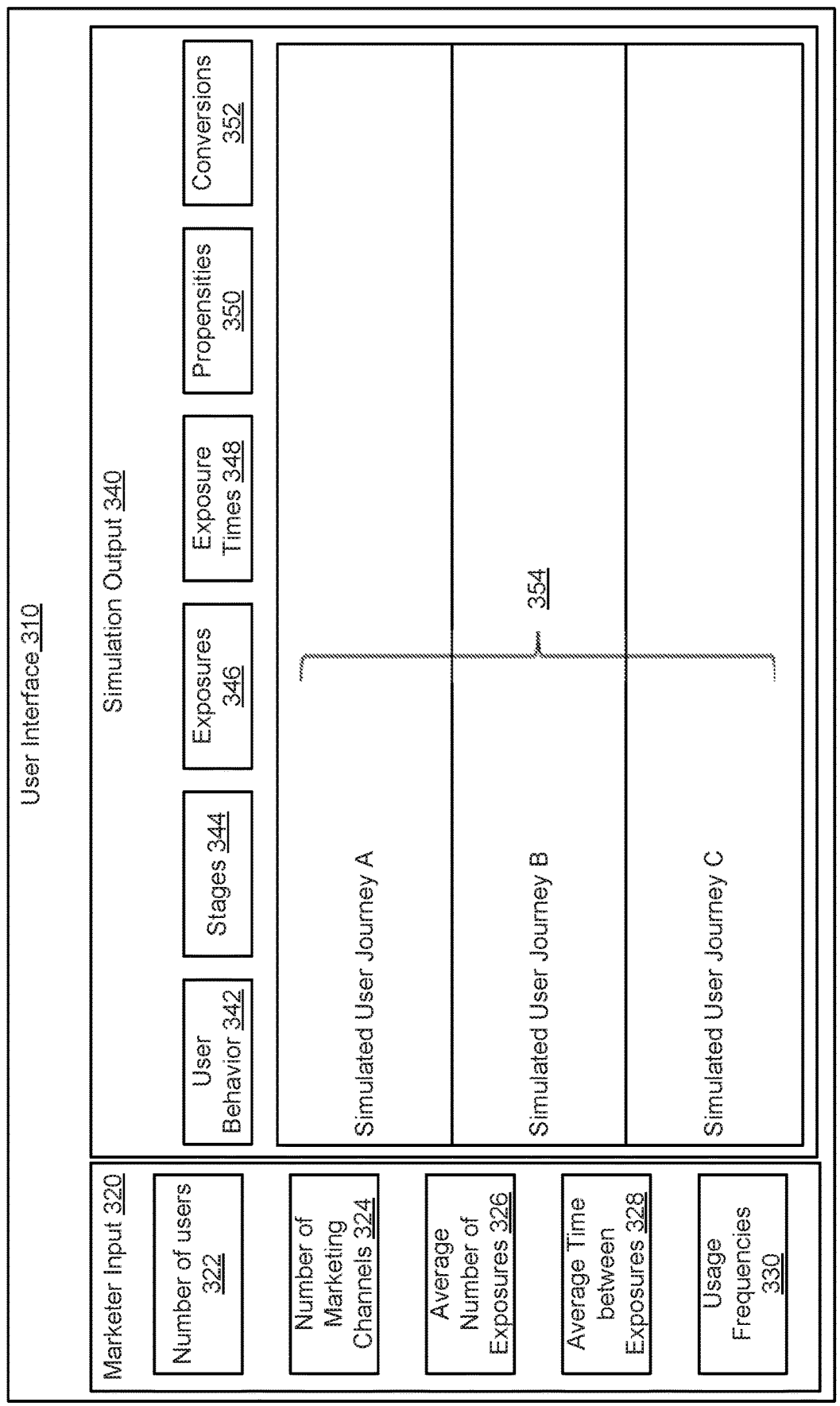
FIG. 3 illustrates an example user interface to set parameters of a simulation used to evaluate marketing channel attribution models, according to certain embodiments of the present disclosure.

FIG. 3 illustrates an example user interface 310 for receiving a marketer's input (or any other user with proper credentials) to simulate user journeys and for presenting an output of the simulation. The user interface 310 is an example of the user interface 210 described in connection with FIG. 2. For instance, the received input information is usable to the simulation engine 220 and the presented output is generated from the simulation engine 220.

As illustrated, the user interface 310 presents a first information category, shown as a marketer input 320, and a second information category, shown as a simulation output 340. The marketer input 320 enables inputs of the marketer to provide a set of parameters. The set of parameters are used to simulate the user journeys. The output of the simulation is presented under the simulation output 340.

In particular, the marketer input 320 presents different fields to capture the set of parameters. These fields include, for example, a number of users 322, a number of marketing channels 324, an average number of exposures 326, an average time between exposures 328, and usage frequencies 330. The number of users 322 represents a target number of users that should be exposed to some or all of the marketing channels within a marketing campaign. The number of marketing channels 324 represents the total number of the marketing channels of the marketing campaign. The average number of exposures 326 represents the average, per user, of the number of the marketing channels that should be exposed to the user. The average time between exposures 328 represents the average duration of time between two consecutive exposures of a user to respective marketing channels. The usage frequencies 330 represents the average frequency of usage of a marketing channel within the marketing campaign. These different fields are provided for illustrative purposes. A larger or smaller and/or other fields can be presented at the user interface 310 to solicit marketer's input. Generally, the marketer inputs, at the user interface 310, information specific to the marketer (e.g. identifying a marketing campaign of the marketer), the marketing campaign (e.g., the number of marketing channels, average usage frequencies, etc.), and/or the users (e.g., the average number of users, average number of exposures, etc.).

On the other hand, the simulation output 340 presents information about the simulated user journeys. The information is organized along multiple dimensions. One dimension lists different aspects of the user journeys. For example, this dimension includes user behavior 342, stages 344, exposures 346, exposure times 348, propensities 350, and conversion 352. Another dimension lists each of the simulate user journeys 354.

The user behavior 342 represents a simulated behavior of a user with respect to the user's attitude towards a conversion. For example, the user can be impulsive, skeptical, or careful. The stages 344 represent simulated stages that a user passes through in the conversion process. For example, these stages include going from a stage of awareness of a product to a stage of desiring the product. The exposures 346 represent the simulated exposures of a user to a number of marketing channels. For example, the user is exposed to two marketing channels out of five potential marketing channels that belong to a marketing campaign. The exposure times 348 represent simulated times of when the respective exposures occurred. For example, the user is exposed at "time one" to a first marketing channel and "time one plus a time increment" to the first marketing channel. The propensities 350 represent, for each of the simulated exposures, the propensity of a conversion from the exposure. For example, a propensity of 0.1 for an exposure to a marketing channel indicates a ten percent likelihood of a conversion from the exposure. The conversions 352 represent, for each of the simulated exposures, whether a conversion occurred or not. For example, a flag is associated with each of the exposures 348 and is set to "one" to reflect a conversion and to "0" otherwise. The conversion 352 can also include other information, such as a simulated revenue from an individual conversion and a total revenue from multiple conversions occurring within a simulated user journey. These different types of information are presented for each of the simulated user journeys 354. For example, a first simulated user journey shows particular user behavior, conversion stages, exposures, exposure times, propensities, and conversions. A second simulated user journey shows at least one different simulated output (e.g., a different behavior, or a same behavior, but with different conversion stages, etc.)

The different information described in connection with the simulation output 340 is provided for illustrative purposes. A larger or smaller and/or other outputs of the simulation can be presented at the user interface 310 to solicit marketer's input. Generally, the simulated outputs include simulated user exposures to marketing channels and simulated user responses (e.g., conversions) to the simulated user exposures. The outputted information can be categorized in being user-specific (e.g., the user behavior, the stages of the conversion cycle, etc.), marketing campaign-specific (e.g., the exposures, the exposure times, etc.), and/or marketer-specific (e.g., which marketing channels are simulated and the revenue of conversion).

Similarly, the two information categories are presented for illustrative purposes. A larger or smaller and/or other information categories can be presented at the user interface 310 to solicit marketer's input. For example, the user interface 310 presents information about a marketing campaign to a marketer (e.g., the selected marketing channels, attributions, allocated resources, etc.). In this example, the marketer input 320 can be pre-populated with values derived from the information about the marketing campaign (e.g., the number of users, average number of exposures, etc.). The marketer needs simply to confirm or adjusts these values under the marketer input 320.

Hence, by operating the user interface 310, a marketer sets and/or adjusts user, marketer, and marketing campaign specific parameters. In turn, the user interface 310 presents different information about simulated user journeys given the parameters.

Figure 4:
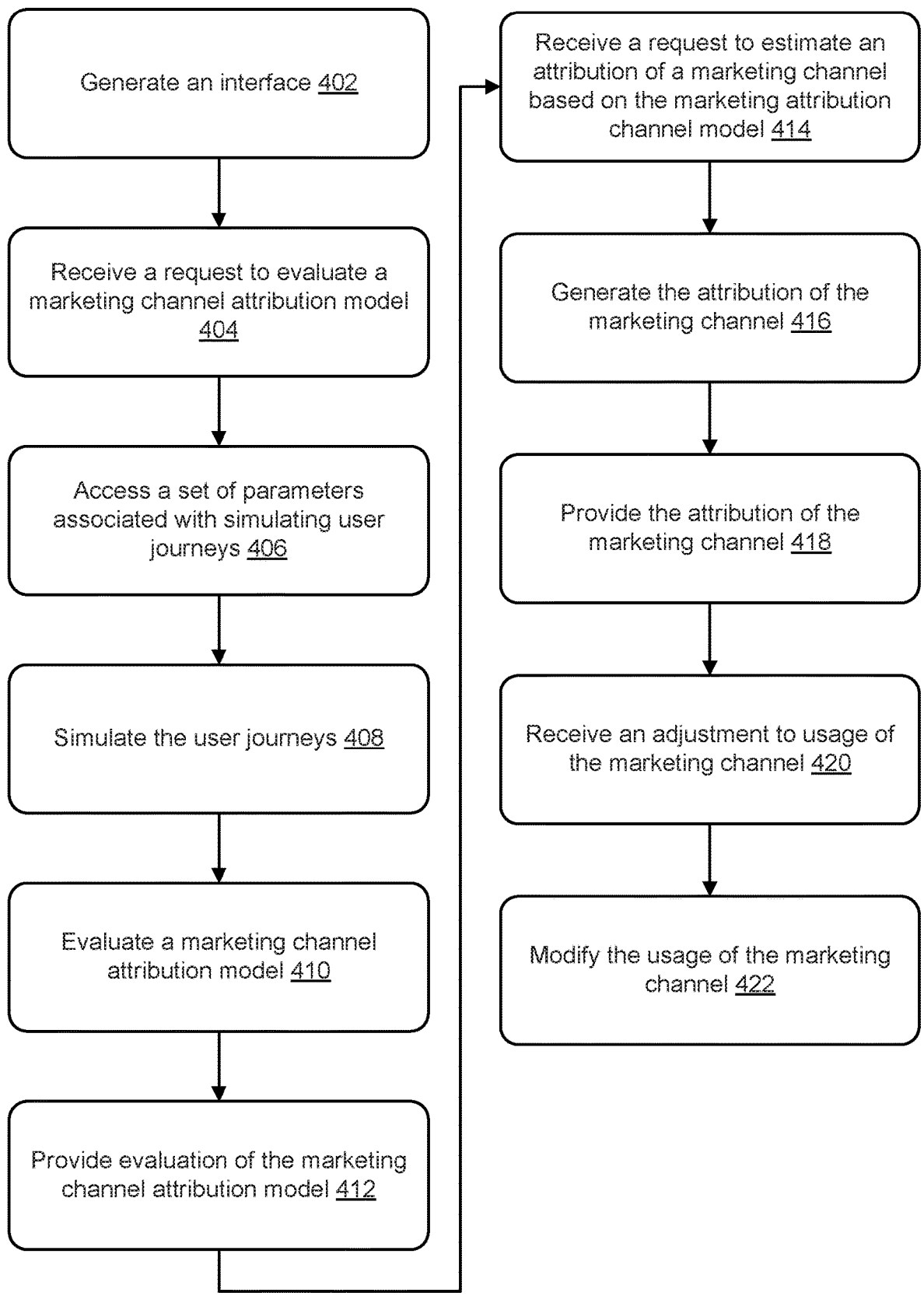
FIG. 4 illustrates an example flow for providing an evaluation of a marketing channel attribution channel to a marketer device as part of managing a marketing campaign, according to certain embodiments of the present disclosure.
Figure 5:
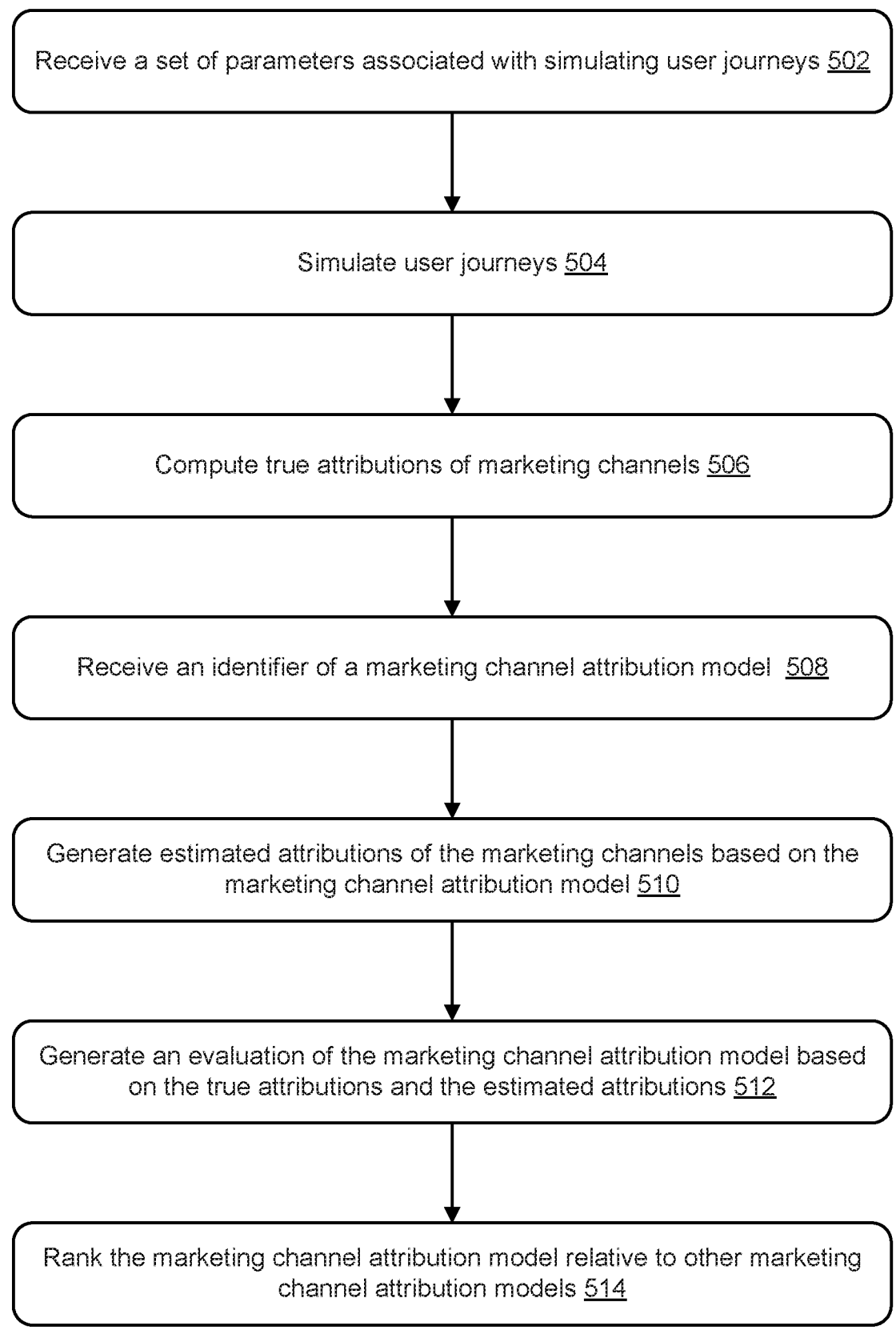
FIG. 5 illustrates an example flow for evaluating a marketing channel attribution channel based on a simulation of user journeys, according to certain embodiments of the present disclosure.
Figure 6:
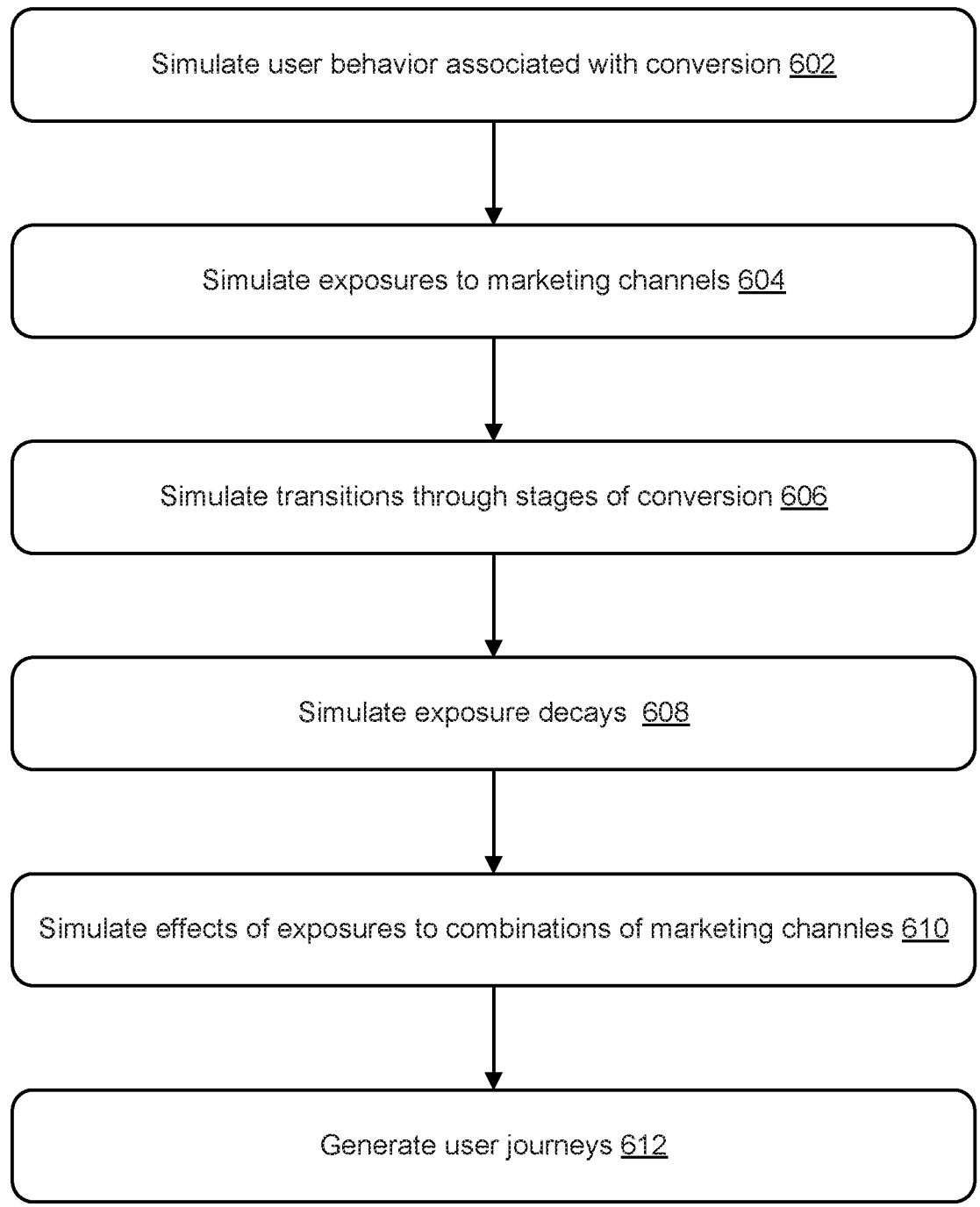
FIG. 6 illustrates an example flow for simulating user journeys, according to certain embodiments of the present disclosure.
Figure 7:
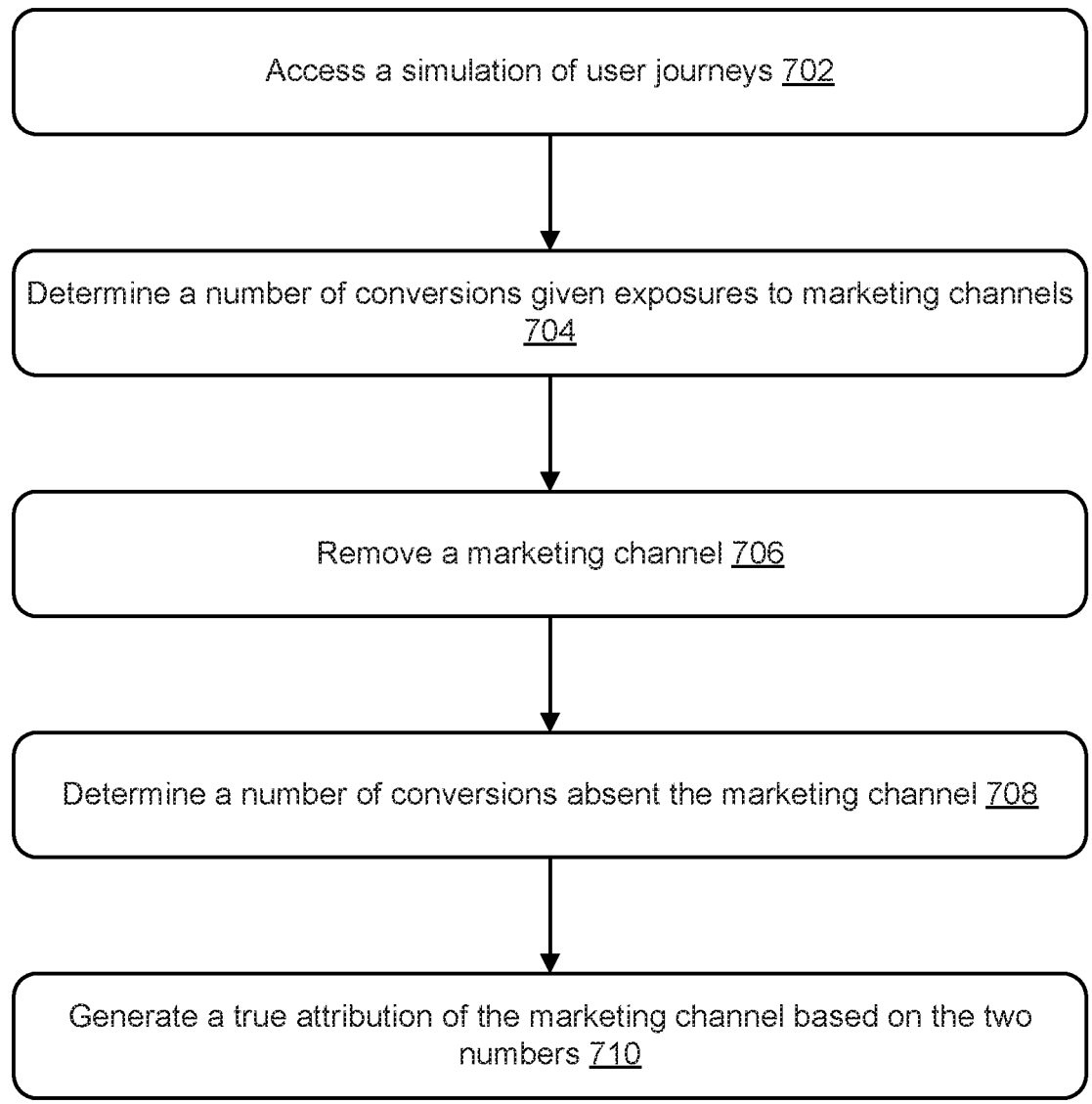
FIG. 7 illustrates an example flow for determining a true attribution of a marketing channel, according to certain embodiments of the present disclosure.
Figure 8:
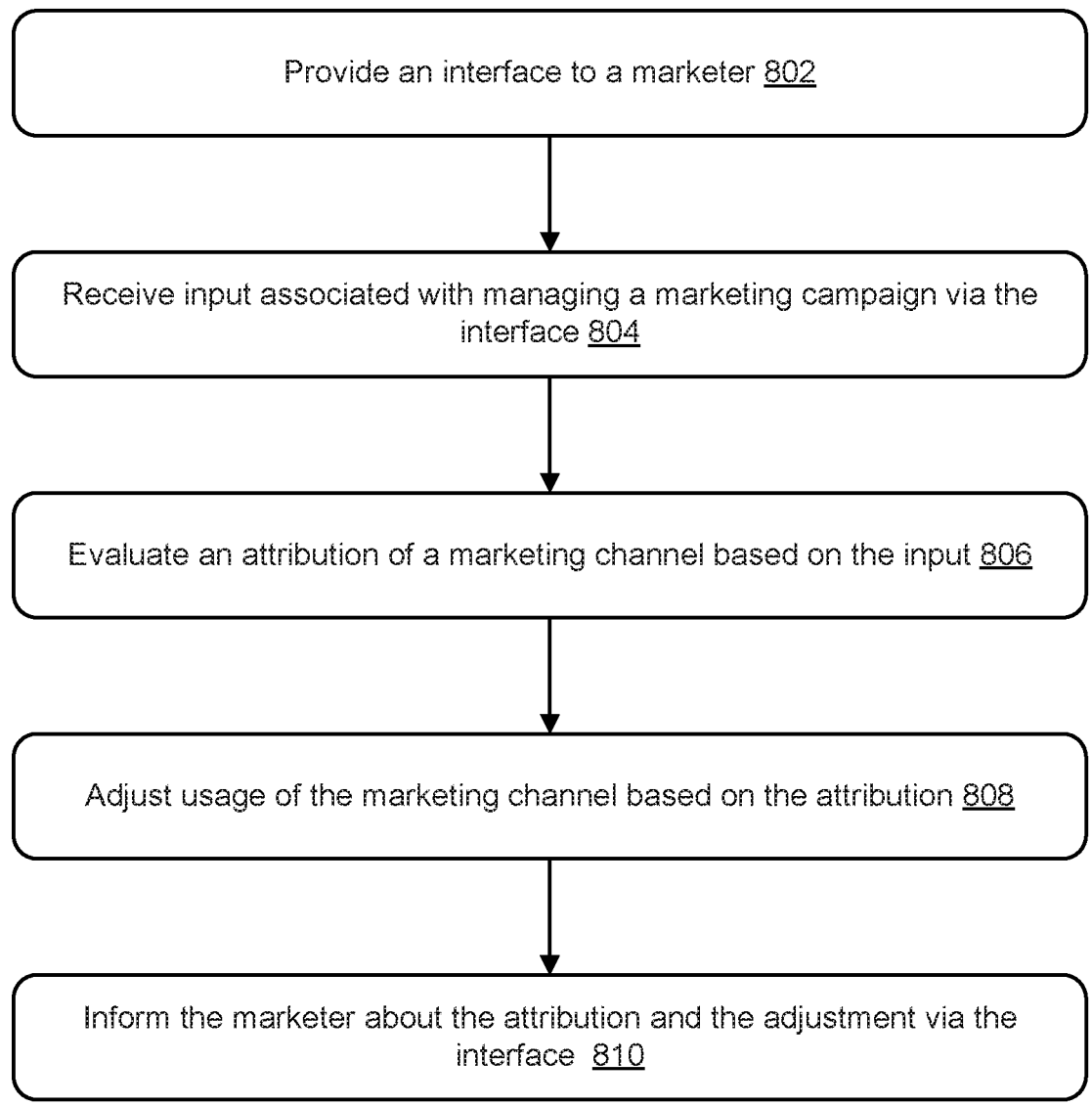
FIG. 8 illustrates an example flow for dynamically managing a marketing campaign, according to certain embodiments of the present disclosure.

Turning to FIGS. 4-8, the figures illustrate example flows related to simulating user journey and/or evaluating marketing channel attribution models. In particular, the example flow of FIG. 4 illustrates an example flow for managing a marketing campaign based on simulations of user journeys and evaluation of marketing campaign attribution models. In comparison, FIG. 5 illustrates an example flow for the simulations and evaluation. FIG. 6 illustrates a more detailed example flow for the simulation and FIG. 7 illustrates a more detailed example flow for the evaluation. FIG. 8 illustrates an example flow for dynamically managing the marketing campaign based on input of a marketer. Some of the operations between the two example flows can be similar. Such similarities are not repeated herein in the interest of clarity of explanation.

While the operations are illustrated in a particular order, it should be understood that no particular order is necessary and that one or more operations may be omitted, skipped, and/or reordered. In the interest of clarity of explanation, a computing system is illustrated as performing the illustrative operations. The computing system implements some or all of the components and modules illustrated in FIGS. 1 and 2. Nevertheless, other systems, or specific modules hosted on such systems, can be configured to implement one or more of the operations and/or one or more steps of the operations.

The example flow of FIG. 4 starts at operation 402, where an interface is generated. For example, the computing system generates the interface for identifying different aspects related to managing a marketing campaign and provides the interface to a marketer device of a marketer. These aspects include, for example, identifying marketing channels, selecting marketing channel attribution models, inputting parameters for simulating user journeys, specifying selection rules for selecting a marketing attribution model, and/or specifying adjustment rules for adjusting usage of the marketing channels. The interface is presented at the marketer device.

At operation 404, a request of the marketer to evaluate a marketing channel attribution model is received. For example, the computing system receives the request from the marketer device via the interface. The request can identify one of the marketing channel attribution models stored at or accessible to the computing system. Additionally or alternatively, the request can include the marketing channel attribution model (e.g., the request uploads such a model to the computing system). Generally, the request need not be limited to one marketing channel attribution model and can, instead, identify multiple ones.

At operation 406, a set of parameters is accessed. The set of parameters is associated with simulating the user journeys. For example, the computing system receives an input of the marketer about the set of parameters via the interface. In another example, the computing system derives the set of parameters from information about a marketing campaign of the marketer. The set of parameters includes user-specific, marketer-specific, and/or marketing campaign-specific parameters for the simulation.

At operation 408, the user journeys are simulated. For example, the computing system applies different models (e.g., likelihood, distributions, and other event-based models) to simulate the user journeys given the set of parameters as further illustrated in FIG. 6.

At operation 410, the marketing channel attribution model is evaluated. In an example, only the requested model(s) is evaluated. In another example, additional models are also evaluated to allow a model comparison and accordingly recommend one of the models. The computing system inputs the simulated user journeys to the each of marketing channel attribution models under evaluation. Based on the output, the computing system generates an evaluation of how accurately the model(s) estimates attributions and a relative ranking of the model(s) based on respective accuracies.

At operation 412, the evaluation of the marketing channel attribution is provided to the marketer device. In an example, the computing system outputs information about the accuracy and the ranking of the requested model to the interface. In another example, the computing system outputs such information for all of the evaluated models and recommends that the highest ranked model should be used to estimate the attributions of the marketing channels.

At operation 414, a request to estimate an attribution of a marketing channel is received. For example, the computing system receives the request from the marketer device via the interface. Generally, the request need not be limited to a single marketing channel. Instead, the request can be for some or all marketing channels within a marketing campaign. The request is based on the evaluation of the marketing channel attribution model. For example, the request identifies or selects the marketing channel attribution model having the highest accuracy. As such, the marketer specifies what model to apply based on the accuracies. For example, if the requested model from operation 404 is the most accurate, that model is applied. Otherwise, the marketer selects a more accurate marketing channel attribution model. In this case, the computing system uses this other selected model to estimate the attribution.

At operation 416, the attribution of the marketing channel is generated. For example, the computing system tracks or has access to tracked user exposures to the marketing channels of the marketing campaign and user responses (e.g., conversions or no-conversions) to the user exposures. The computing system inputs this data to the marketing channel attribution model to estimate the respective attributions of the marketing channels.

At operation 418, the attribution of the marketing channel is provided to the marketer device. For example, the computing system identifies the marketing channel and presents the attribution via the interface. The attributions of the remaining marketing channels can be similarly presented.

At operation 420, an adjustment to use the marketing channel is received. For example, the computing system receives the adjustment from the marketer device via the interface. The adjustment updates usage of the marketing channel within the marketing campaign (e.g., reallocated resources, updates the frequency of usage, etc.).

At operation 422, usage of the marketing channel is modified. For example, the computing system manages the usage of the marketing channel. Accordingly, the computing system modifies the usage based on the adjustment. For instance, if the adjustment is for reducing the frequency usage, the marketing channel is used less frequently within the marketing campaign.

FIG. 5 illustrates an example flow for simulating the user journeys and evaluating the attribution models. Some or all of the illustrated operations can be implemented as part of operations 404-408 of FIG. 4.

The example flow of FIG. 5 starts at operation 502, where a set of parameters associated with simulating user journeys is received. For example, the computing system receives the information about the parameters from the marketer device via the user interface. The information includes, for example, the number of users, the number of marketing channels, the average number of exposures, the average time between exposures, usage frequencies of the marketing channels, and/or other user-specific, marketer-specific, and/or marketing campaign-specific parameters.

At operation 504, the user journeys are simulated. For example, the computing system simulates the user journeys, including user exposures and user responses, given the set of parameters. The simulation involves simulating different aspects of the user journeys including, for instance, the number of users to target, number of marketing channels, average number of exposures, average time between exposures, frequency of marketing channels, decays of exposures, combined effect of multiple exposures, conversion stages, and user behavior. FIG. 6 illustrates a further example flow for simulating the user journeys.

At operation 506, true attributions of the marketing channels are computed. For example, the computing system computed, for each marketing channel, the true attribution based on the simulated user journeys. FIG. 7 illustrates a further example flow for computing the true attributions.

At operation 508, an identifier of a marketing channel attribution model is received. For example, the computing system receives a request to evaluate the marketing channel attribution model from the marketer device via the interface. The request identifies or includes the marketing channel attribution model.

At operation 510, estimated attributions of the marketing channels are generated based on the marketing channel attribution model. For example, the computing system inputs the simulated journeys to the marketing channel attribution model. The output includes the estimated attributions of the marketing channels.

At operation 512, an evaluation of the marketing channel attribution model is generated based on the true attributions and the estimated attributions of the marketing channels. For example, the computing system compares the true attributions to corresponding estimated attributions to generate a metric that indicates an accuracy of the marketing channel attribution model. Generally, the larger the deviation between true and estimated attributions, the less accurate the marketing channel attribution model is. In an example, the metric includes the root mean square error (RMSE) of the estimated attributions from the true attributions. The RMSE gives a sense of how close the estimated attributions are to the true attributions. In another example, the metric alternatively or additionally includes a Kendall-tau rank correlation coefficient. For instance, the marketing channels are arranged in an ascending order given the estimated attributions. The combinations of the marketing channels are also arranged in an ascending order given the true attributions. The Kendall-tau rank correlation coefficient is computed based on the ascending orders of the marketing channels and the combinations. The two metrics supplement each other. RMSE captures the big differences in the attributed values and can be insensitive to the smaller differences. The Kendall-tau rank correlation coefficient captures the ranking of the marketing channels and, hence, is more sensitive towards the smaller differences in the attributed values.

At operation 514, the marketing channel attribution model is ranked relative to other marketing channel attribution models. These other models are identified based on the request of the marketer or are used as a default. For example, the computing system generates, for each of the other models, estimated attributions from the simulated user journeys. The computing system also implements different ranking techniques based on the estimated attributions of the different models and the true attributions common to all of the models. In an example, one or both of the metrics described in connection with operation 512 are computed for each of the marketing channels attribution models. The models are ranked according to the metrics (e.g., the marketing attribution channel model having the smallest RMSE and/or the highest Kendall-tau rank correlation is ranked the highest or most accurate).

Turning to FIG. 6, the figure illustrates an example flow for simulating user journeys. Some or all of the illustrated operations can be implemented as part of operation 504 of FIG. 5. The operations of the example flow of FIG. 6 are provided for illustrative purposes. Variations to the operations can also be implemented. The description following FIG. 6 provides examples of such variations.

The example flow of FIG. 6 starts at operation 602, where user behavior associated with a conversion (or any other user response) is simulated. The user behavior includes, for example, a user being impulsive, skeptical, or careful. In an example, the computing system simulates the user behavior as an equal probability distribution between the different potential behaviors.

At operation 604, user exposures to marketing channels are simulated. In an example, the computing system accesses an average number of user exposures, frequency of use of marketing channels, and an average time between the user exposures. This information is available from a set of parameters provided from the marketer device or derived from the marketing campaign. The computing system simulates the user exposures by selecting a number of the marketing channels corresponding to the exposures and by setting the times between the exposures. The number of the marketing channels are simulated as a Poisson distribution having the average number of user exposures. The frequency of use is simulated as a probability of a multinomial distribution uses to simulate the type of user exposure. The marketing channels are selected from the ones belonging to the marketing campaign based on the simulated number and based on the frequency of use. The timing between exposures is simulated as an exponential random variable having the average time.

At operation 606, transitions through stages of conversion (or other user behavior) are simulated. The stages include for example, awareness, interest, and desire. In an example, the computing system simulates the stages as an equal probability distribution among the different potential stages.

At operation 608, exposure decays are simulated. The effect of exposing a user to a marketing channel typically decays over time (e.g., the likelihood of conversion due to a previous exposure decreases over time). In an example, the computing system simulates the exposure decays by using a decay function.

At operation 610, effects of exposures to combinations of marketing channels are simulated. An exposure to one marketing channel can influence the user response to an exposure to another marketing channel. As such, combinations of marketing channels have interactive influence on the conversion (or any other user response). In an example, the computing system simulates the effects using a non-parametric algorithm that generates the different combinations of marketing channels and measures the effect of each of the combinations to the conversion.

At operation 612, the user journeys are generated based on the different simulations. In an example, the computing system outputs the user journeys. Each user journey corresponds to a combination of user behavior, exposures, transitions through stages, exposure decays, and marketing channel combination effects.

In an example, the operations or variations of the operations of FIG. 6 are implemented at a simulation engine hosted on the computing system. The marketer has control, via the interface, over several different parameters to simulate the user journeys. Although described hereinabove, these parameters and simulation are further described herein next in the interest of clarity of explanation.

One example parameter includes the number of users to target. The marketer has control over the number of users to expose to the marketer's marketing activities. Marketing activities range from highly targeted (fewer number of users), segmented marketing (high number of users) as well as mass marketing (huge number of users).

Another example parameter includes the number of marketing channels. The marketer can use different number of marketing channels to target the users depending on the purpose of the marketing activity. A marketing activity can vary from focused email campaign (fewer number of marketing channels) to a general brand building campaigns (higher number of email marketing channels). Let the marketing channels be denoted by "$(X_1, X_2, \ldots, X_k)$."

Another example parameter includes the average number of user exposures to marketing channels. The marketer, while designing a marketing strategy, would decide the number of user exposures and provides this number as an input parameter. The number of user exposures is simulated to be a Poisson random variable, with mean equal to this input parameter. Assume user "i" is exposed to "k" marketing channels and the marketer has decided that a user on average would be exposed to "$t_{avg}$" marketing channels. The user exposures "k" is simulated as "k~Poisson ($t_{avg}$)."

Another example parameter includes the average time between touches. The marketer, while planning a series of marketing activities, needs to decide the time between two marketing activities. The time between the touches is simulated to be an Exponential random variable. Assuming that a user "i" has been exposed to a marketing channel "$X_i$" and the marketer has decided that a user would be exposed to another marketing channel "$X_j$," the next exposure time "touchtime$_{avg}$." The time at which the next marketing channel would be exposed to the user "i" is denoted by "$t_{ij}$." "$t_{ij}$" is simulated as "$t_{ij}$~Exponential (touchtime$_{avg}$)."

Another example parameter includes the frequency of marketing channels. The marketer uses certain marketing channels more frequently than others. Hence, the marketer could also control the frequency of the channels being exposed to the users. These frequencies are interpreted as the probabilities of the multinomial distribution used to simulate the type of marketing interaction a customer has to be exposed.

Another example parameter includes the effect of marketing exposures on a user. In particular, the effect would decay over time. The marketer has the capability to simulate varying decay effects for each type of user exposure. The decay of a user exposure "$X_k$," is denoted by "$\lambda_k$."

Another example parameter includes the of user exposures. The marketing channels could have an interactive influence effect on a conversion (or other user behavior). The marketer has the capability to create scenarios to increase or decrease the interaction effect between user exposures. This could be useful for a marketer wanting to compare multiple attribution models under different levels of interactions. The interactive effect of two marketing channels $X_j$" and $X_l$" are denoted by "$\beta_{jl}$."

Another example parameter includes the stages and buying behavior. The marketer has the capability to capture the stages of a customer's conversion cycle (or other cycles of user responses) and heterogeneity of the customers. The propensity of a user to convert depends on the stage of the customer in the conversion funnel and user behavior. The various stages of the conversion funnel include awareness, interest, and, desire. Heterogeneity of the user behavior includes the user being impulsive, skeptical, and careful.

Given a user, the user behavior is simulated first. Next, the different user exposures are simulated. Each user exposure can have an effect on the user's conversion. In addition, each user exposure can make a customer transition through different stages in the conversion funnel. Based on the user exposure, movement between stages of the conversion cycle is simulated. The user exposures could occur at different points of time. The effect of each user exposure could decay over time. Also, the marketing touches exposures could have synergistic effects between them. Both these effects are simulated to find the propensity of a user to convert. The propensity of a user is assumed to be the cumulative effect of all the marketing channels that the user has been exposed to until that point of time. This cumulative effect mainly includes two effects: decayed main effect of each marketing channel and synergistic effect.

The simulation of these different parameters uses the following model. Assume that a certain user has been simulated to have been exposed to "$(X_1, X_2, \ldots, X_k)$" at times "$(t_1, t_2, \ldots, t_k)$." The heterogeneity of the user is simulated to be "$b_0$" and the stage of the user in the conversion funnel at time "$(t_1, t_2, \ldots, t_k)$." is simulated to be "$(s_1, s, \ldots, s_k)$." The propensity of the user to convert after user exposure is determined. This propensity is modeled as the probability of binary conversion event denoted by "Y" at each time point after a user exposure. The probability of conversion of the user at time "$t_k$" is modeled as follows:

$$\log(Pr(Y=1|(X_1, X_2, \ldots, X_k)/Pr(Y=0|X_1, X_2, \ldots X_k)) = \\ f(s_k) + g(b) + \sum_{i=1}^{k} B_i * \lambda_i^{t_k - t_i} + \sum_{j=1}^{k}\sum_{l=1}^{k} \beta_{jl} * \lambda_l^{t_k - t_i} * \lambda_j^{t_k - t_j}$$

The first term captures the stage of the user at time "$t_k$." The function "f" maps the stages of the user to the space of real numbers. This could be a one-to-one mapping or a random function. The second term captures the heterogeneity exhibited by the user, which is assumed to remain constant over time. The function "g" maps the behavior of the user to the space of real numbers. Similar to "f," "g" could be a one-to-one or a random mapping. The third term captures the decayed main effect of all user exposure until time"$t_k$." The fourth term captures the decayed interactive effects at time "$t_k$." Using the above equation and a similar setting, the propensity of conversion is modeled for any simulated user journey at any point in time. After modelling the propensities of conversion, the conversion event is simulated as a Bernoulli random variable with the calculated propensity from the above equation.

Turning to FIG. 7, the figure illustrates an example flow for generating a true attribution of a marketing channel based on simulated user journeys. Some or all of the illustrated operations can be implemented as part of operation 506 of FIG. 5. The operations of the example flow of FIG. 7 are provided for illustrative purposes. Variations to the operations can also be implemented.

The example flow of FIG. 7 starts at operation 702, where a simulation of user journeys are accessed. For example, the computing system accesses the simulation from local memory of the computing system or from a remote data store accessible to the computing system. Assume that the simulation includes "n" users for using "k" marketing channels.

At operation 704, a number "r" of user conversions is determined. This number "r" represents the conversions that are achieved for "n" users given the exposures to the "k" marketing channels. In an example, the computing system determines the number "r" from the outputs of the simulation.

At operation 706, a marketing channel "j" is removed. In an example, to find the attribution of marketing channel "j" of the "k" total marketing channels, the computing system finds the number of conversions that would have occurred if the marketing channel "j" was not used. That is, in all the simulated user journeys, the user exposures to the marketing channel "j" are removed.

At operation 708, the number of conversions "s" is determined for when the marketing channel "j" is removed. In an example, the computing system finds the number of conversions "s" that would have occurred in the simulated user journeys when the user exposures to the marketing channel "j" are removed.

At operation 710, a true attribution of the marketing channel based on the two numbers is generated. In an example, the computing system computes the difference in the conversions "(r-s)." The difference is considered to be the true attribution of marketing channel "j." A similar method is followed for all remaining marketing channels.

Turning to FIG. 8, the example flow starts at operation 802, where an interface is provided to the marketer. For example, the computing system generates the interface. The interface is presented at the marketer device. The interface is configured to receive various inputs of the marketer as further illustrated at operation 804 and to present various outputs to the marketer as illustrated at operation 810.

At operation 804, input associated with managing the marketing campaign is received via the interface. For example, the computing system receives the input from the marketer device. Different types of input are possible. One example input identifies a selection rule for selecting between available marketing channel attribution models based on associated accuracies. For instance, the selection rule specifies that the most accurate marketing channel attribution model should be used to estimate attributions of the marketing channels. Another example input identifies an adjustment rules for adjusting usage of a marketing channel based on an associated attribution. For instance, the adjustment rule specifies that resources allocated to the marketing channel should be reallocated when the attribution falls below a threshold. Such selection and adjustment rules enable the computing system to dynamically and automatically control what marketing channel attribution model to apply, balance usage of the marketing channels, and optimize usage of the underlying resources.

At operation 806, an attribution of a marketing channel is evaluated based on the input. For example, the computing system simulates user journeys given parameter specific to the marketing campaign. The computing system accordingly evaluates the accuracies of different marketing channel attribution models and selects one of the models based on the selection rule. The computing system inputs tracked user journeys to the selected model to output the attribution of the marketing channel.

At operation 808, usage of the marketing channel is adjusted based on the attribution. For example the computing system adjusts the usage based on the adjustment rule. For instance, if the usage falls below the threshold, the computing system reallocates the associated resources to another marketing channel (e.g., one with a higher attribution).

At operation 810, the marketer is informed about the attribution and the adjustment via the interface. For example, the computing system outputs inputs about the accuracies of the marketing channel attribution models, information about the attributions of the marketing channels, and information about the adjustments to the interface. Depending on the input of the marketer, the adjustments are automatically applied or a permission to do so is requested from the marketer.

Figure 9:
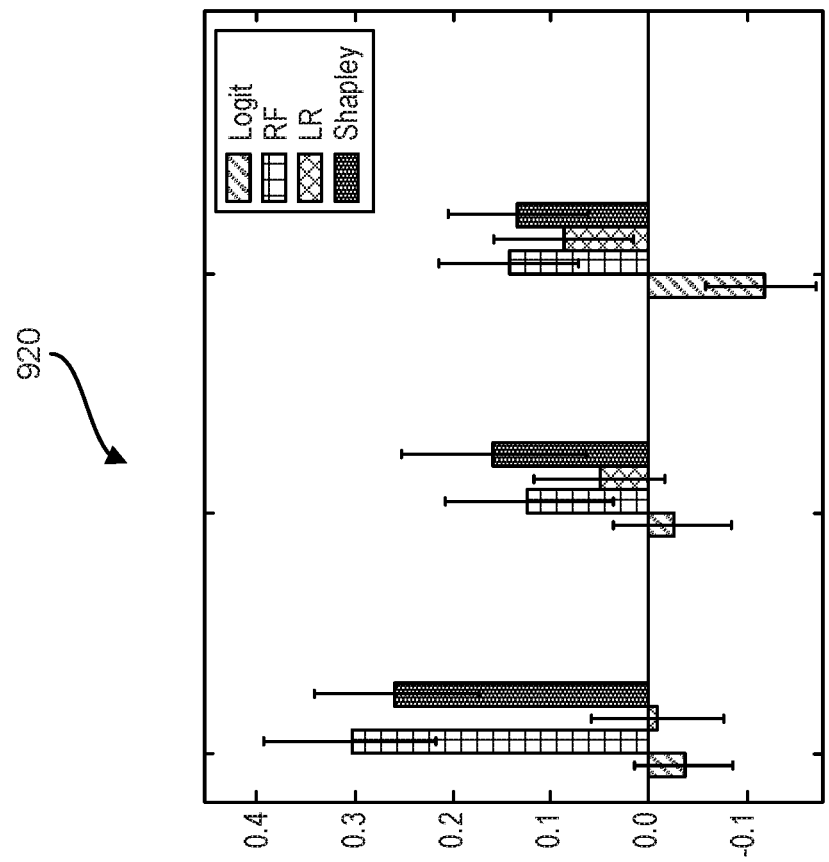
FIG. 9 illustrates an example comparison of evaluative metrics of different marketing channel attribution models, according to certain embodiments of the present disclosure.
Figure 9:
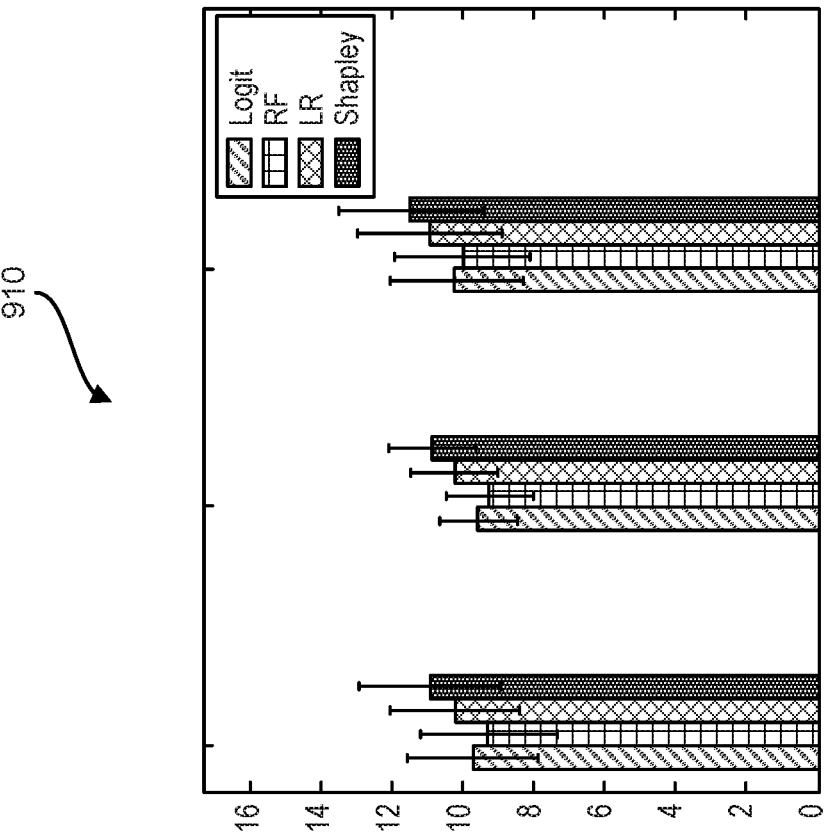

Turning to FIG. 9, the figure illustrates an evaluation of different marketing channel attribution models based on a simulation of user journeys. The plot 910 illustrates a ranking of the four marketing channel attribution models known in the art: Logit, random forest, linear regression, and Shapley. The horizontal axis of the plot 910 corresponds to three different types of the simulation, where each type uses a particular set of parameters. The vertical axis of the plot 910 corresponds to RMSE of the estimated attributions from the true attributions. The lower the RMSE, the more accurate the corresponding model is. As illustrated, the RF marketing channel attribution model provides the best accuracy in all three types of simulation.

The plot 920 provides another evaluation of the four marketing channel attribution models. The horizontal axis of the plot 920 also corresponds to the three different types of the simulation. The vertical axis of the plot 920 corresponds to Kendall-tau correlation coefficient. The higher that coefficient, the more accurate the corresponding model is. As illustrated, the RF marketing channel attribution model provides the best accuracy in the first and last types of simulation.

Figure 10:
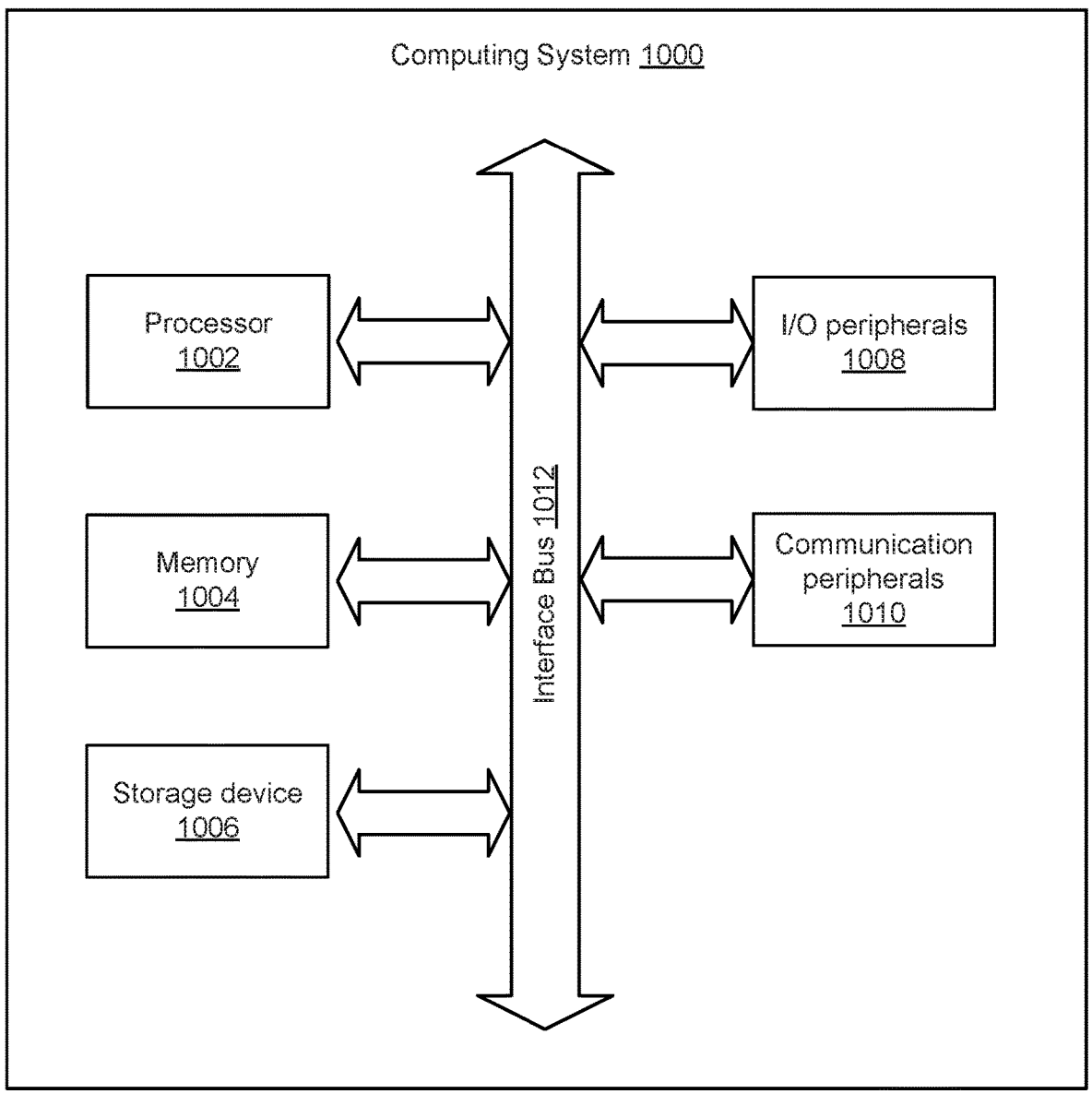
FIG. 10 illustrates an example computing environment suitable for use in implementations of the present disclosure.

Turning to FIG. 10, the figure illustrates example components for implementing some or all of the components of the server 130 and/or the marketer device 120 of FIG. 1. Although the components are illustrated as belonging to a same computing system 1000, this system can be distributed.

The computing system 1000 includes at least a processor 1002, a memory 1004, a storage device 1006, input/output peripherals 1008, communication peripherals 1010, and an interface bus 1012. The interface bus 1012 is configured to communicate, transmit, and transfer data, controls, and commands among the various components of the computing system 1000. The memory 1004 and the storage device 1006 include computer readable storage media, such as RAM, ROM, electrically erasable programmable read-only memory (EEPROM), hard-drives, CD-ROMs, optical storage devices, magnetic storage devices, electronic non-volatile computer storage, for example Flash® memory, and other tangible storage media. Any of such computer readable storage media can be configured to store instructions or program codes embodying aspects of the disclosure. The memory 1004 and the storage device 1006 also include computer readable signal media. A computer readable signal medium includes a propagated data signal with computer readable program code embodied therein. Such a propagated signal takes any of a variety of forms including, but not limited to, electromagnetic, optical, or any combination thereof. A computer readable signal medium includes any computer readable medium that is not a computer readable storage medium and that can communicate, propagate, or transport a program for use in connection with the computing system 1000.

Further, the memory 1004 includes an operating system, programs, and applications. The processor 1002 is configured to execute the stored instructions and includes, for example, a logical processing unit, a microprocessor, a digital signal processor, and other processors. The memory 1004 and/or the processor 1002 can be virtualized and can be hosted within another computing system of, for example, a cloud network or a datacenter. The input and output peripherals 1008 include user interfaces such as a keyboard, screen, microphone, speaker, other input/output devices, and computing components such as graphical processing units, serial ports, parallel ports, universal serial bus, and other input/output peripherals. The input/output peripherals 1008 are connected to the processor 1002 through any of the ports coupled to the interface bus 1012. The communication peripherals 1010 are configured to facilitate communication between the computing system 1000 and other computing devices over a communications network and include, for example, a network interface controller, modem, wireless and wired interface cards, antenna, and other communication peripherals.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art. Indeed, the methods and systems described herein may be embodied in a variety of other forms; furthermore, various omissions, substitutions and changes in the form of the methods and systems described herein may be made without departing from the spirit of the present disclosure. The accompanying claims and their equivalents are intended to cover such forms or modifications as would fall within the scope and spirit of the present disclosure.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software that programs or configures the computing system from a general-purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements and/or steps are in any way required for one or more examples or that one or more examples necessarily include logic for deciding, with or without author input or prompting, whether these features, elements and/or steps are included or are to be performed in any particular example.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Similarly, the use of "based at least in part on" is meant to be open and inclusive, in that a process, step, calculation, or other action "based at least in part on" one or more recited conditions or values may, in practice, be based on additional conditions or values beyond those recited. Headings, lists, and numbering included herein are for ease of explanation only and are not meant to be limiting.

The various features and processes described above may be used independently of one another, or may be combined in various ways. All possible combinations and sub-combinations are intended to fall within the scope of the present disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed examples. Similarly, the example systems and components described herein may be configured differently than described. For example, elements may be added to, removed from, or rearranged compared to the disclosed examples.

The invention claimed is:

1. A method in which one or more processing devices perform operations comprising:
   accessing a set of parameters associated with simulating user exposures to electronic content-delivery channels and user responses to the user exposures;
   executing a simulation that comprises simulating, based on the set of parameters, user exposures, times between user exposures, and user responses;
   generating an evaluation that indicates an accuracy of a channel attribution model when estimating an attribution of an electronic content-delivery channel to a user response, wherein the evaluation is generated based on the simulated user exposures, the simulated times between user exposures, and the simulated user responses;
   ranking the channel attribution model relative to another channel attribution model based on the evaluation of the channel attribution model;
   selecting the channel attribution model based on the ranking;
   estimating the attribution of the electronic content-delivery channel by applying the selected channel attribution model to actual user exposures and actual user responses; and
   causing a content delivery device to allocate content-delivery resources to the electronic content-delivery channel in accordance with the selected channel attribution model and thereby provide interactive content via the electronic content-delivery channel.

2. The method of claim 1, wherein generating the evaluation that indicates the accuracy of the channel attribution model comprises:
   generating a first metric for estimating the accuracy of the channel attribution model, the first metric generated based on a true attribution of the electronic content-delivery channel and the estimated attribution of the electronic content-delivery channel; and
   generating a second metric for comparing the accuracy of the channel attribution model to another accuracy of another channel attribution model.

3. The method of claim 2, wherein ranking the channel attribution model relative to another channel attribution model based on the evaluation of the channel attribution model comprises assigning a first rank to the channel attribution model and a second rank lower than the first rank to the other channel attribution model, wherein the first rank and the second rank are assigned based on a combination of the first metric and the second metric.

4. The method of claim 3, wherein:
   the first metric is computed from a root mean square error between the true attribution of the electronic content-delivery channel and the estimated attribution of the electronic content-delivery channel,
   the second metric is a Kendall-tau rank correlation coefficient, and
   the first rank and the second rank are assigned based on the combination of the first metric and the second metric comprises (i) determining that a first root mean square error for the channel attribution model is less than a second root mean square error for the other channel attribution model and (ii) determining that a first Kendall-tau rank correlation coefficient for the channel attribution model is greater than a second Kendall-tau rank correlation coefficient for the other channel attribution model.

5. The method of claim 2, wherein generating the true attribution of the electronic content-delivery channel comprises:
   accessing the simulation;
   determining a first set of the user responses for a first set of the simulated users exposures for a set of electronic content-delivery channels that includes the electronic content-delivery channel;
   removing the electronic content-delivery channel from the set of electronic content-delivery channels;

determining a second set of the user responses for a second set of the simulated users exposures for the set of electronic content-delivery channels from which the electronic content-delivery channel has been removed; and computing the true attribution from a difference between the first set of the user responses and the second set of the user responses.

6. The method of claim 1, further comprising:
providing a graphical interface having an input section for selecting or inputting the set of parameters;
updating an output section of the graphical interface to present results of the simulation.

7. The method of claim 1, further comprising:
receiving, from a content management device, input identifying a different electronic channel attribution model, a selection rule that specifies a selection between the electronic channel attribution model and the different electronic channel attribution model, and an adjustment rule that specifies an adjustment to the electronic content-delivery channel;
ranking the electronic channel attribution model and the different electronic channel attribution model based on the simulated user exposures and the simulated user responses;
selecting the electronic channel attribution model based on the ranking and based on the selection rule;
estimating an attribution of the electronic content-delivery channel based on the electronic channel attribution model; and
adjusting usage of the electronic content-delivery channel by the content delivery device based on the estimated attribution and the adjustment rule.

8. A system comprising:
a data storage device storing a set of parameters associated with simulating user exposures to electronic content-delivery channels and user responses to the user exposures;
a simulation engine for executing, based on the set of parameters, a simulation of user exposures, times between user exposures, and user responses;
an analytical tool for:
generating an evaluation that indicates an accuracy of a channel attribution model when estimating an attribution of an electronic content-delivery channel to a user response, wherein the evaluation is generated based on the simulated user exposures, the simulated times between user exposures, and the simulated user responses;
ranking the channel attribution model relative to another channel attribution model based on the evaluation of the channel attribution model; and
selecting the channel attribution model based on the ranking;
an attribution estimator for estimating the attribution of the electronic content-delivery channel by applying a channel attribution model, which is selected based on the ranking, to actual user exposures and actual user responses; and
a campaign manager engine for allocating content-delivery resources to the electronic content-delivery channel in accordance with the selected channel attribution model, wherein said allocating causes interactive content to be provided via the electronic content-delivery channel.

9. The system of claim 8, wherein generating the evaluation that indicates the accuracy of the channel attribution model comprises:
generating a first metric for estimating the accuracy of the channel attribution model, the first metric generated based on a true attribution of the electronic content-delivery channel and the estimated attribution of the electronic content-delivery channel; and
generating a second metric for comparing the accuracy of the channel attribution model to another accuracy of another channel attribution model.

10. The system of claim 9, wherein ranking the channel attribution model relative to another channel attribution model based on the evaluation of the channel attribution model comprises assigning a first rank to the channel attribution model and a second rank lower than the first rank to the other channel attribution model, wherein the first rank and the second rank are assigned based on a combination of the first metric and the second metric.

11. The system of claim 10, wherein:
the first metric is computed from a root mean square error between the true attribution of the electronic content-delivery channel and the estimated attribution of the electronic content-delivery channel,
the second metric is a Kendall-tau rank correlation coefficient, and
the first rank and the second rank are assigned based on the combination of the first metric and the second metric comprises (i) determining that a first root mean square error for the channel attribution model is less than a second root mean square error for the other channel attribution model and (ii) determining that a first Kendall-tau rank correlation coefficient for the channel attribution model is greater than a second Kendall-tau rank correlation coefficient for the other channel attribution model.

12. The system of claim 9, wherein generating the true attribution of the electronic content-delivery channel comprises:
accessing the simulation;
determining a first set of the user responses for a first set of the simulated users exposures for a set of electronic content-delivery channels that includes the electronic content-delivery channel;
removing the electronic content-delivery channel from the set of electronic content-delivery channels;
determining a second set of the user responses for a second set of the simulated users exposures for the set of electronic content-delivery channels from which the electronic content-delivery channel has been removed; and
computing the true attribution from a difference between the first set of the user responses and the second set of the user responses.

13. The system of claim 8, further comprising a content management device configured for:
providing a graphical interface having an input section for selecting or inputting the set of parameters;
updating an output section of the graphical interface to present results of the simulation.

14. A non-transitory computer-readable storage medium storing instructions that, when executed on a computing system, configure the computing system to perform operations comprising:
accessing a set of parameters associated with simulating user exposures to electronic content-delivery channels and user responses to the user exposures;

executing a simulation that comprises simulating, based on the set of parameters, user exposures, times between user exposures, and user responses;

generating an evaluation that indicates an accuracy of a channel attribution model when estimating an attribution of an electronic content-delivery channel to a user response, wherein the evaluation is generated based on the simulated user exposures, the simulated times between user exposures, and the simulated user responses;

ranking the channel attribution model relative to another channel attribution model based on the evaluation of the channel attribution model;

selecting the channel attribution model based on the ranking;

estimating the attribution of the electronic content-delivery channel by applying the selected channel attribution model to actual user exposures and actual user responses; and causing a content delivery device to allocate content-delivery resources to the electronic content-delivery channel in accordance with the selected channel attribution model and thereby provide interactive content via the electronic content-delivery channel.

15. The non-transitory computer-readable medium of claim 14, wherein generating the evaluation that indicates the accuracy of the channel attribution model comprises:

generating a first metric for estimating the accuracy of the channel attribution model, the first metric generated based on a true attribution of the electronic content-delivery channel and the estimated attribution of the electronic content-delivery channel; and generating a second metric for comparing the accuracy of the channel attribution model to another accuracy of another channel attribution model.

16. The non-transitory computer-readable medium of claim 15, wherein ranking the channel attribution model relative to another channel attribution model based on the evaluation of the channel attribution model comprises assigning a first rank to the channel attribution model and a second rank lower than the first rank to the other channel attribution model, wherein the first rank and the second rank are assigned based on a combination of the first metric and the second metric.

17. The non-transitory computer-readable medium of claim 16, wherein:

the first metric is computed from a root mean square error between the true attribution of the electronic content-delivery channel and the estimated attribution of the electronic content-delivery channel, the second metric is a Kendall-tau rank correlation coefficient, and the first rank and the second rank are assigned based on the combination of the first metric and the second metric comprises (i) determining that a first root mean square error for the channel attribution model is less than a second root mean square error for the other channel attribution model and (ii) determining that a first Kendall-tau rank correlation coefficient for the channel attribution model is greater than a second Kendall-tau rank correlation coefficient for the other channel attribution model.

18. The non-transitory computer-readable medium of claim 15, wherein generating the true attribution of the electronic content-delivery channel comprises:

accessing the simulation;

determining a first set of the user responses for a first set of the simulated users exposures for a set of electronic content-delivery channels that includes the electronic content-delivery channel;

removing the electronic content-delivery channel from the set of electronic content-delivery channels;

determining a second set of the user responses for a second set of the simulated users exposures for the set of electronic content-delivery channels from which the electronic content-delivery channel has been removed; and computing the true attribution from a difference between the first set of the user responses and the second set of the user responses.

19. The non-transitory computer-readable medium of claim 14, the operations further comprising:

providing a graphical interface having an input section for selecting or inputting the set of parameters;

updating an output section of the graphical interface to present results of the simulation.

20. The non-transitory computer-readable medium of claim 14, the operations further comprising:

receiving, from a content management device, input identifying a different electronic channel attribution model, a selection rule that specifies a selection between the electronic channel attribution model and the different electronic channel attribution model, and an adjustment rule that specifies an adjustment to the electronic content-delivery channel;

ranking the electronic channel attribution model and the different electronic channel attribution model based on the simulated user exposures and the simulated user responses;

selecting the electronic channel attribution model based on the ranking and based on the selection rule;

estimating an attribution of the electronic content-delivery channel based on the electronic channel attribution model; and adjusting usage of the electronic content-delivery channel by the content delivery device based on the estimated attribution and the adjustment rule.

* * * * *